US012672198B2

(12) United States Patent
Hong

(10) Patent No.: US 12,672,198 B2
(45) Date of Patent: Jun. 30, 2026

(54) MBS DATA PROCESSING METHOD AND DEVICE

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 444 days.

(21) Appl. No.: 18/029,998

(22) PCT Filed: Oct. 19, 2021

(86) PCT No.: PCT/KR2021/014548
§ 371 (c)(1),
(2) Date: Apr. 3, 2023

(87) PCT Pub. No.: WO2022/086109
PCT Pub. Date: Apr. 28, 2022

(65) Prior Publication Data
US 2023/0380002 A1     Nov. 23, 2023

(30) Foreign Application Priority Data

| Oct. 19, 2020 | (KR) | ........................ | 10-2020-0135363 |
| Mar. 16, 2021 | (KR) | ........................ | 10-2021-0034012 |
| Oct. 14, 2021 | (KR) | ........................ | 10-2021-0136320 |

(51) Int. Cl.
*H04W 76/27*     (2018.01)
*H04W 68/00*     (2009.01)
*H04W 76/40*     (2018.01)

(52) U.S. Cl.
CPC ......... *H04W 76/27* (2018.02); *H04W 68/005* (2013.01); *H04W 76/40* (2018.02)

(58) Field of Classification Search
CPC .... H04W 76/27; H04W 76/40; H04W 68/005
USPC ......................................................... 370/329
See application file for complete search history.

(56) References Cited

U.S. PATENT DOCUMENTS

| 2004/0185837 A1 | 9/2004 | Kim et al. | |
| 2016/0087810 A1 | 3/2016 | Zhang et al. | |
| 2019/0182632 A1* | 6/2019 | Fujishiro | ............... H04W 48/16 |
| 2019/0223250 A1 | 7/2019 | Dao et al. | |
| 2021/0120618 A1 | 4/2021 | Lee et al. | |

(Continued)

FOREIGN PATENT DOCUMENTS

| KR | 10-0584449 B1 | 5/2006 |
| KR | 10-2015-0144323 A | 12/2015 |

(Continued)

OTHER PUBLICATIONS

R2-2007029 (Year: 2020).*

(Continued)

*Primary Examiner* — Intekhaab A Siddiquee
(74) *Attorney, Agent, or Firm* — IP Legal Services, LLC

(57) ABSTRACT

Provided are a method and device for processing multicast and broadcast services (MBS) data. The method includes switching a radio resource control (RRC) state to an RRC inactive state, receiving a message for MBS session state notification from a base station, and initiating an RRC connection resume procedure for an RRC state change based on the message

9 Claims, 15 Drawing Sheets

(56)                 References Cited

U.S. PATENT DOCUMENTS

2021/0345438 A1    11/2021  Dao et al.

FOREIGN PATENT DOCUMENTS

WO         2018/174625  A1      9/2018
WO      WO-2021229346  A1 *  11/2021    ............. H04L 67/14

OTHER PUBLICATIONS

R2-2007033 (Year: 2020).*
R2-2007631 (Year: 2020).*
63024049P (Year: 2020).*
Huawei et al., "Idle/Inactive UE support for NR MBS", R2-2007029, 3GPP TSG-RAN WG2 Meeting #111-e, Electronic meeting, Aug. 17-28, 2020.
European Patent Office, Extended European Search Report of corresponding EP Patent Application No. 21883178.2, Aug. 8, 2024.
3GPP, "3rd Generation Partnership Project; Technical Specification Group Services and System Aspects; Study on architectural enhancements for 5G multicast-broadcast services (Release 17)", 3GPP TR 23.757 V1.0.0, Sep. 2020, pp. 1-225.

* cited by examiner

SYNC : Protocol to synchronise
data used to generate a certain
radio frame

FIG.11

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>This bit can be used for only operation with shared spectrum channel access and if nrofPDCCH-MonitoringOccasionPerSSB-InPO is present.<br>If set to 1: indication that the UE may stop monitoring PDCCH occasion(s) for paging in this Paging Occasion as specified in TS 38.304 [20], clause 7.1. |
| 4~8 | Not used in this release of the specification, and shall be ignored by UE if received. |

FIG.12

Paging message

```
Paging ::=                    SEQUENCE {
    pagingRecordList          PagingRecordList              OPTIONAL, -- Need N
    lateNonCriticalExtension  OCTET STRING                  OPTIONAL,
    nonCriticalExtension      SEQUENCE{}                    OPTIONAL
}

PagingRecordList ::=          SEQUENCE (SIZE(1..maxNrofPageRec)) OF PagingRecord PagingRecord ::=              SEQUENCE {
    ue-Identity               PagingUE-Identity,
    accessType                 ENUMERATED {non3GPP}   OPTIONAL,   -- Need N
    ...
}

PagingUE-Identity ::=         CHOICE {
    ng-5G-S-TMSI               NG-5G-S-TMSI,
    fulII-RNTI                I-RNTI-Value,
    ...
}
```

MBS DATA PROCESSING METHOD AND DEVICE

CROSS REFERENCE TO RELATED APPLICATIONS

This application is a National Stage Patent Application of PCT International Patent Application No. PCT/KR2021/014548 (filed on Oct. 19, 2021) under 35 U.S.C. § 371, which claims priority to Korean Patent Application Nos. 10-2020-0135363 (filed on Oct. 19, 2020), 10-2021-0034012 (filed on Mar. 16, 2021), and 10-2021-0136320 (filed on Oct. 14, 2021), the teachings of which are incorporated herein in their entireties by reference.

TECHNICAL FIELD

The disclosure relates to a method and device for a user equipment (UE) to process multicast/broadcast service (MBS) data in an NR-based mobile communication network.

BACKGROUND ART

Cellular mobile communication networks have been mainly developed to provide end-to-end/point-to-point transmission services, but the development of broadband wireless transmission technologies and terminals that provide various functions are leading to demand for various services. In particular, multimedia broadcast multicast services (MBMS) is a technology that may provide mobile broadcasting services using a cellular mobile communication network. Recently, various techniques are being developed to provide disaster relief communication services using enhanced MBMS (hereinafter, "eMBMS").

Unlike the end-to-end transmission service, MBMS is an end-to-many/point-to-multipoint transmission service and may advantageously increase the efficiency of use of radio resources by transmitting the same packet to multiple terminals within a single cell. Further, the MBMS service adopts a multi-cell transmission scheme that enables a plurality of base stations to simultaneously transmit the same packet, and such multi-cell transmission scheme allows the terminal receiving the service to obtain a diversity gain in the physical layer.

However, when the base station transmits MBMS service data, the efficiency may vary depending on the number of UEs receiving the corresponding data. Therefore, there is required a technique for controlling MBS data based on NR and providing an MBS even in various UE RRC states.

DETAILED DESCRIPTION OF THE INVENTION

Technical Problem

The disclosure provides a method and device for a UE to efficiently process MBS data.

Technical Solution

In an aspect, the present embodiments provide a method for processing multicast and broadcast services (MBS) data by a UE. The method may include switching an radio resource control (RRC) state to an RRC inactive state, receiving a message for MBS session state notification from a base station, and initiating an RRC connection resume procedure for an RRC state change based on the message.

In another aspect, the present embodiments provide a method for controlling, by a base station, multicast and broadcast services (MBS) data processing of a UE. The method may include transmitting, to the UE, an RRC connection release message including information for indicating whether to activate an MBS session, transmitting a message for MBS session state notification to the UE in a state in which the UE switches to an RRC inactive state, and receiving an RRC connection request message from the UE when the UE initiates an RRC connection resume procedure based on the message.

In another aspect, the present embodiments provide a UE processing multicast and broadcast services (MBS) data. The UE may include a controller configured to control switching an RRC state to an RRC inactive state and a receiver configured to receive a message for MBS session state notification from a base station, wherein the controller initiates an RRC connection resume procedure for an RRC state change based on the message.

In another aspect, the present embodiments provide a base station controlling multicast and broadcast services (MBS) data processing of a UE. The base station may include a transmitter configured to transmit, to the UE, an RRC connection release message including information for indicating whether to activate an MBS session and transmitting, to the UE, a message for MBS session state notification in a state in which the UE switches to an RRC inactive state and a receiver receiving an RRC connection request message from the UE when the UE initiates an RRC connection resume procedure based on the message.

Advantageous Effects

According to the embodiments of the disclosure, a UE may efficiently process MBS data.

BRIEF DESCRIPTION OF THE DRAWINGS

FIG. 11 is a view illustrating a short message bit of a paging message according to an embodiment.

FIG. 12 is a view illustrating an information element included in a paging message according to an embodiment.

MODE FOR CARRYING OUT THE INVENTION

Figure 1:
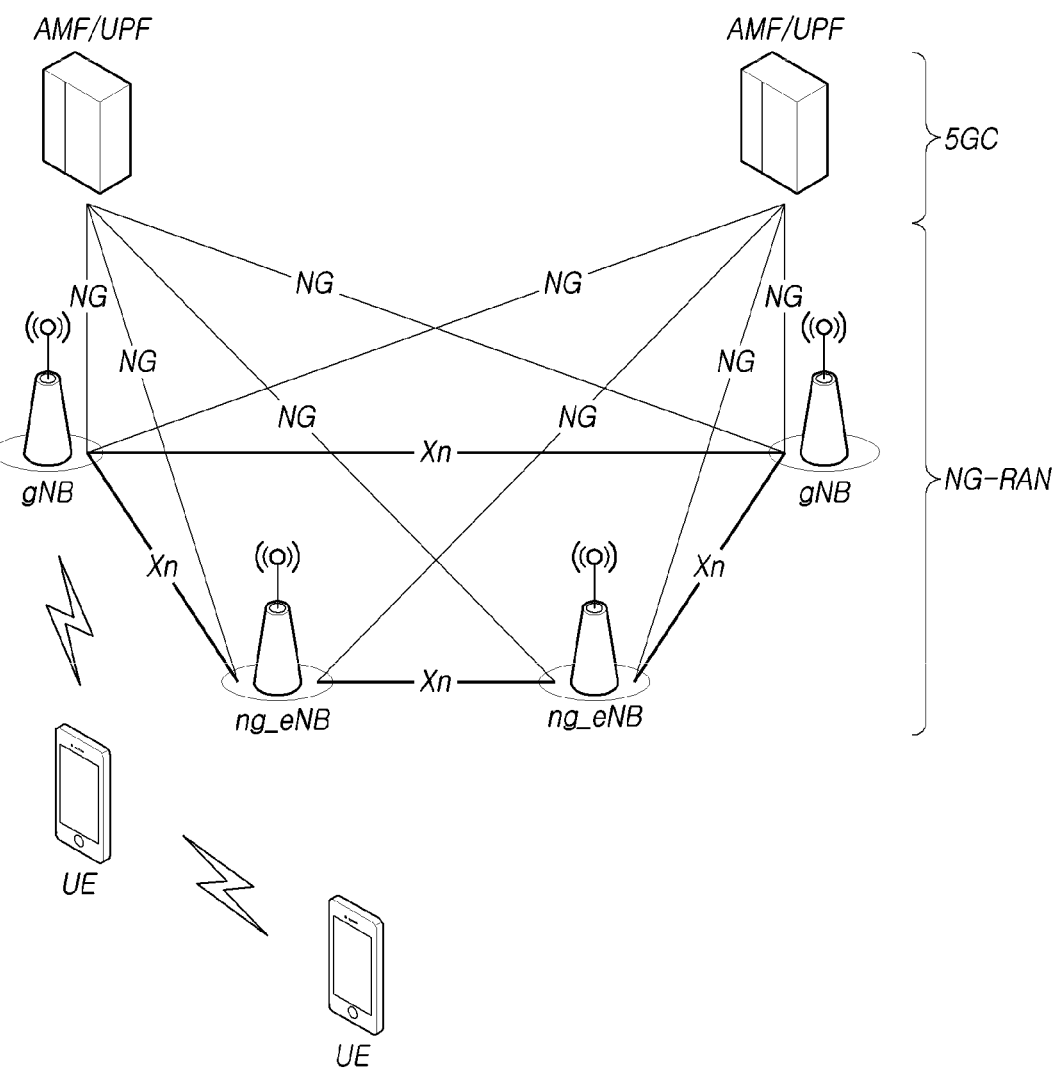
FIG. 1 is a view schematically illustrating a structure for an NR wireless communication system.

Hereinafter, embodiments of the disclosure will be described in detail with reference to the accompanying drawings. The same or substantially the same reference denotations are used to refer to the same or substantially the same elements throughout the specification and the drawings. When determined to make the subject matter of the present invention unclear, the detailed of the known art or functions may be skipped. The terms "comprises" and/or "comprising," "has" and/or "having," or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof. As used herein, the singular forms "a", "an" and "the" are intended to include the plural forms as well, unless the context clearly indicates otherwise.

Such denotations as "first," "second," "A," "B," "(a)," and "(b)," may be used in describing the components of the present invention. These denotations are provided merely to distinguish a component from another, and the essence of the components is not limited by the denotations in light of order or sequence.

In describing the positional relationship between components, when two or more components are described as "connected", "coupled" or "linked", the two or more components may be directly "connected", "coupled" or "linked", or another component may intervene. Here, the other component may be included in one or more of the two or more components that are "connected", "coupled" or "linked" to each other.

In relation to components, operational methods or manufacturing methods, when A is referred to as being "after," "subsequent to," "next," and "before," A and B may be discontinuous from each other unless mentioned with the term "immediately" or "directly."

When a component is designated with a value or its corresponding information (e.g., level), the value or the corresponding information may be interpreted as including a tolerance that may arise due to various factors (e.g., process factors, internal or external impacts, or noise).

In the disclosure, 'wireless communication system' means a system for providing various communication services, such as a voice service and a data packet service, using a radio resource. The wireless communication system may include a user equipment (UE), a base station, or a core network.

The present embodiments disclosed below may be applied to wireless communication systems using various radio access technologies. For example, the present embodiments may be applied to various radio access technologies, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). Further, radio access technology may mean not only a specific access technology, but also a communication technology for each generation established by various communication organizations, such as 3rd generation partnership project (3GPP), 3GPP2, Wi-Fi, Bluetooth, institute of electronical and electronics engineers (IEEE), and international telecommunication union (ITU). For example, CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented with a wireless technology, such as institute of electrical and electronic engineers (IEEE) 802.11 (Wi-Fi), IEEE 802.16 (WiMAX), IEEE 802-20, evolved UTRA (E-UTRA), and the like. IEEE 802.16m is an evolution of IEEE 802.16e and provides backward compatibility with IEEE 802.16e-based systems. UTRA is part of UMTS (universal mobile telecommunications system). 3GPP (3rd generation partnership project) LTE (long term evolution) is part of E-UMTS (evolved UMTS) using evolved-UMTS terrestrial radio access (E-UTRA) and adopts OFDMA for downlink and SC-FDMA for uplink. As such, the present embodiments may be applied to currently disclosed or commercialized radio access technologies and may also be applied to radio access technologies currently under development or to be developed in the future.

Meanwhile, in the disclosure, 'UE' is a comprehensive concept meaning a device including a wireless communication module that communicates with a base station in a wireless communication system. 'UE' should be interpreted as a concept that may include not only user equipment (UE) in, e.g., WCDMA, LTE, new radio (NR), high speed packet access (HSPA), and international mobile telecommunications (IMT)-2020 (5G or new radio), but also a mobile station (MS), user terminal (UT), subscriber station (SS), or wireless device in global system for mobile communications (GSM). Further, the UE may be a user portable device, such as a smartphone, according to the usage type and, in the vehicle to everything (V2X) communication system, the UE may mean a vehicle or a device including a wireless communication module in the vehicle. Further, in the case of a machine type communication system, the UE may mean an machine type communication (MTC) terminal, machine to machine (M2M) terminal, or ultra-reliable low latency communication (URLLC) terminal equipped with a communication module to perform machine type communication.

In the disclosure, 'base station' or 'cell' refers to a terminal that communicates with a UE in terms of a network and in concept encompasses various coverage areas, such as node-B, evolved node-B (eNB), gNode-B (gNB), low power node (LPN), sector, site, various types of antennas, base transceiver system (BTS), access point, point (e.g. transmission point, reception point, or transmission/reception point), relay node, mega cell, macro cell, micro cell, pico cell, femto cell, remote radio head (RRH), radio unit (RU), or small cell. Further, 'cell' may mean one including a bandwidth part (BWP) in the frequency domain. For example, 'serving cell' may mean the activation BWP of the UE.

Since there is a base station controlling one or more cells in the various cells enumerated above, the base station may be interpreted in two meanings. The base station may be 1) a device which provides a mega cell, a macro cell, a micro cell, a pico cell, a femto cell, or a small cell in relation to the radio region, or 2) the radio region itself. In 1), the base station may be devices controlled by the same entity or cooperatively interacting with each other to configure a radio region. An embodiment of the base station is a transmission/reception point, transmission point, or reception point depending on the scheme of configuring the radio region. In 2), the base station may be the radio region itself, in which a user equipment (UE) may be enabled to transmit a signal to or receive a signal from another UE or a neighboring base station.

In the disclosure, 'cell' may mean the coverage of the signal transmitted from the transmission/reception point, a component carrier having the coverage of the signal transmitted from the transmission/reception point (transmission point or transmission/reception point), or the transmission/reception point itself.

Uplink (UL) means a scheme for transmitting/receiving data from a UE to a base station, and downlink (DL) means a scheme for transmitting/receiving data from a base station to a UE. Downlink may mean communication or communication path from the multiple transmission/transmission points to the UE, and uplink may mean communication or communication path from the UE to the multiple transmission/reception points. In this case, in the downlink, the transmitter may be part of the multiple transmission/reception points, and the receiver may be part of the UE. Further, in the uplink, the transmitter may be part of the UE, and the receiver may be part of the multiple transmission/reception points.

Uplink and downlink transmit/receive control information through a control channel, such as physical downlink control channel (PDCCH) or physical uplink control channel (PUCCH). Uplink and downlink transmit/receive data through a data channel, such as physical downlink shared channel (PDSCH) or physical uplink shared channel (PUSCH). Hereinafter, 'transmitting or receiving a signal through a channel, such as PUCCH, PUSCH, PDCCH, and PDSCH,' is also referred to as 'transmitting or receiving PUCCH, PUSCH, PDCCH, and PDSCH.'

Although the technical spirit is described focusing primarily on the 3GPP LTE/LTE-A/new RAT (NR) communication system for clarity of description, the technical features are not limited to such communication system.

3GPP develops 5th-generation (5G) communication technology to meet the requirements of the radiocommunication sector of the international telecommunication union (ITU-R)'s next-generation radio access technology after research on 4th-generation (4G) communication technology. Specifically, 3GPP develops new NR communication technology separate from LTE-A pro and 4G communication technology, which have enhanced LTE-advanced technology to meet the requirements of ITU-R, as 5G communication technology. Both LTE-A pro and NR refer to 5G communication technologies. Hereinafter, 5G communication technology is described focusing on NR unless specified as a specific communication technology.

In NR, various operating scenarios have been defined in considerations of satellites, automobiles, and new verticals in the typical 4G LTE scenarios. The operating scenarios may include the enhanced mobile broadband (eMBB) scenario, the massive machine communication (mMTC) scenario that has high UE density but is deployed in a wide range to requires a low data rate and asynchronous access, and the ultra-reliability and low latency (URLLC) scenario that requires high responsiveness and reliability and may support high-speed mobility.

To satisfy requirements of scenarios, NR introduces wireless communication systems that adopt a new waveform and frame structure technology, low-latency technology, ultra-high frequency band (mmWave) supporting technology, and forward compatibility providing technology. In particular, the NR system suggests various technical changes in terms of flexibility to provide forward compatibility. The main technical features of NR are described below with reference to the drawings.

<Overview of NR System>

FIG. 1 is a view illustrating a structure for an NR system.

Referring to FIG. 1, the NR system is divided into a 5G core network (5GC) and an NR-RAN part. The NG-RAN includes gNBs and ng-eNBs providing user plane (SDAP/PDCP/RLC/MAC/PHY) and user equipment (UE) control plane (RRC) protocol termination. The gNBs or the gNB and the ng-eNB are connected to each other through Xn interfaces. The gNB and the ng-eNB are connected to the 5GC through the NG interfaces, respectively. The 5GC may be configured to include an access and mobility management function (AMF) for managing the control plane, such as UE access and mobility control function, and a user plane function (UPF) for controlling the user data control function. NR supports both frequency band below-6 GHz (Frequency Range 1 (FR1) and frequency band above-6 GHz (Frequency Range 2 (FR2)).

The gNB means a base station that provides a UE with NR user plane and control plane protocol termination, and the ng-eNB means a base station that provides a UE with the E-UTRA user plane and control plane protocol termination. In the disclosure, the base station should be understood as encompassing gNB and ng-eNB and, as necessary, be used to separately denote gNB or ng-eNB.

<NR Waveform, Numerology, and Frame Structure>

NR uses a CP-OFDM waveform using a cyclic prefix (CP) for downlink transmission and CP-OFDM or DFT-s-OFDM (discrete Fourier transform spread-orthogonal frequency division multiplexing) for uplink transmission. OFDM technology is easily combined with multiple input multiple output (MIMO) and has the advantages of high frequency efficiency and capability of using a low-complexity receiver.

Meanwhile, since, in NR, the above-described three scenarios have different requirements for data rate, latency, and coverage, it is needed to efficiently meet the requirements for each scenario through the frequency band constituting a NR system. To that end, there has been proposed technology for efficiently multiplexing radio resources based on a plurality of different numerologies.

Specifically, the NR transmission numerology is determined based on the subcarrier spacing and cyclic prefix (CP). As shown in Table 1 below, "μ" is exponentially changed, with the exponent value of 2 with respect to 15 kHz.

TABLE 1

| μ | subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
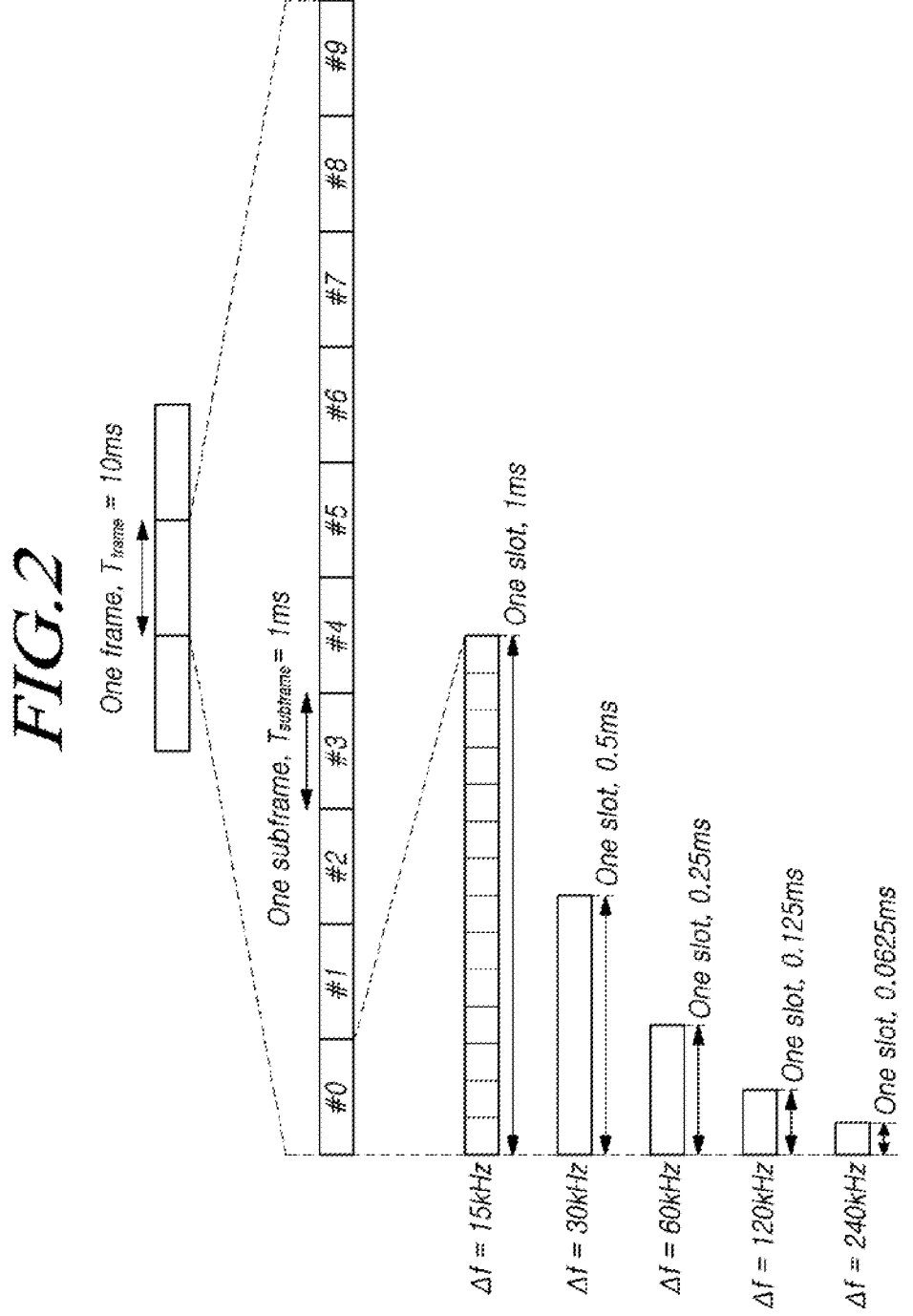
FIG. 2 is a view illustrating a frame structure in an NR system.

As shown in Table 1 above, the NR numerologies may be divided into five types depending on the subcarrier spacing. The NR numerologies differ from LTE (e.g., 4G communication technology) which uses the subcarrier spacing fixed to 15 kHz. Specifically, in NR, the subcarrier spacings used for data transmission are 15, 30, 60, and 120 kHz, and the subcarrier spacings used for synchronization signal transmission are 15, 30, 120, and 240 kHz. Further, an extended CP is applied only to the 60 kHz subcarrier spacing. In NR, a frame is defined to include 10 subframes each having the same length of 1 ms and to have a length of 10 ms. One frame may be divided into half frames of 5 ms, and each half frame may include 5 subframes. In the case of the 15 kHz subcarrier spacing, one subframe is constituted of one slot, and each slot is constituted of 14 OFDM symbols. FIG. 2 is a view illustrating a frame structure in an NR system.

Referring to FIG. 2, a slot is fixedly composed of 14 OFDM symbols in the case of the normal CP, but the length of the slot in a time domain may vary depending on the subcarrier spacing. For example, in the case of a numerology having a 15 kHz subcarrier spacing, a slot has a length of 1 ms which is the same length as the subframe. In contrast, in the case of a numerology having a 30 kHz subcarrier spacing, a slot is constituted of 14 OFDM symbols, but two slots may be included in one subframe. Accordingly, one slot has the length of 0.5 ms. In other words, the subframe and the frame are defined to have a fixed length, and the slot is defined as the number of symbols. Accordingly, the temporal length (e.g., the length of the slot) may vary depending on the subcarrier spacing.

Meanwhile, NR defines a slot as a basic unit for scheduling and, an adopted minislot (or subslot or non-slot based schedule) to reduce transmission latency in the radio section. If a wide subcarrier spacing is used, the length of one slot is inverse-proportionally shortened, so that it is possible to reduce transmission latency in the radio section. The minislot is for efficient support of the URLLC scenario and enables scheduling in the units of 2, 4, or 7 symbols.

Further, NR defines uplink and downlink resource allocation as a symbol level in one slot, unlike LTE. To reduce HARQ latency, a slot structure has been defined to enable HARQ ACK/NACK to be transmitted directly in the transmission slot, and such slot structure is referred to as a self-contained structure in the description.

NR has been designed to support a total of 256 slots. Among them, 62 slot formats are used in 3GPP Rel-15. Further, NR supports a common frame structure that constitutes a FDD frame or a TDD frame through a combination of various slots. For example, all symbols of a slot may be configured as downlink, all symbols of a slot may be configured as uplink, and a slot may be combined with downlink symbols and uplink symbols. Further, NR supports distributed and scheduled data transmission in one or more slots. Therefore, the base station may inform the UE whether the slot is a downlink slot, uplink slot, or flexible slot using the slot format indicator (SFI). The base station may inform a slot format using the SFI by indicating an index of a table configured through UE-specific RRC signaling. Further, the base station may dynamically indicate the slot format through downlink control information (DCI) or may statically or semi-statically indicate the same through RRC.

<NR Physical Resource>

In NR, an antenna port, a resource grid, a resource element, a resource block, and a bandwidth part may be considered as a physical resource.

The antenna port is defined to infer a channel carrying a symbol on an antenna port from another channel carrying another symbol on the same antenna port. For example, in case of inferring large-scale property of a channel carrying a symbol on one antenna port from another channel carrying another symbol on a different antenna port, the two antenna ports may be considered as having a QC/QCL (quasi co-located or quasi co-location) relationship. Here, the large-scale properties include one or more of delay spread, Doppler spread, frequency shift, average received power, and received timing.

Figure 3:
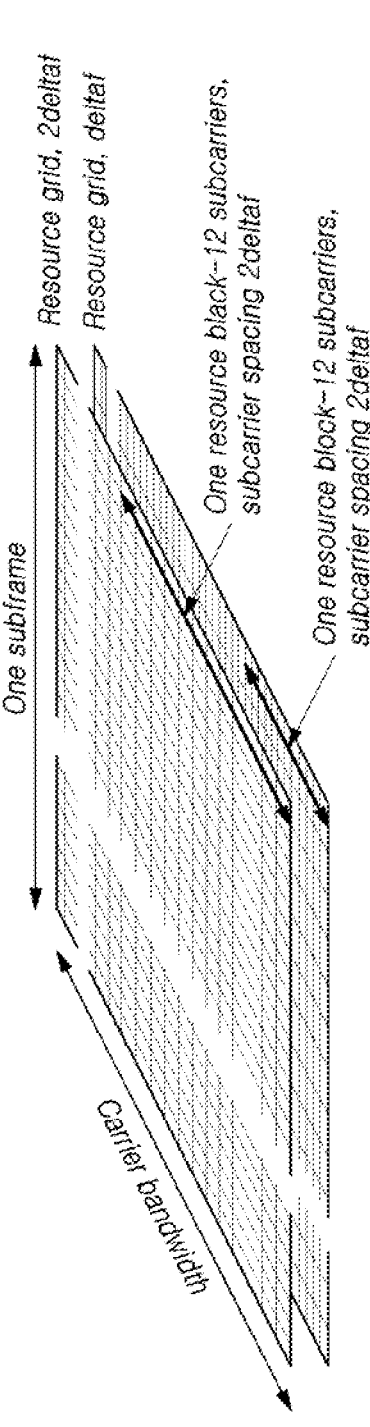
FIG. 3 is a view illustrating a resource grid supported by radio access technology.

FIG. 3 is a view illustrating a resource grid supported by radio access technology.

Referring to FIG. 3, since NR supports a plurality of numerologies in the same carrier, a resource grid may exist per each numerology. Further, the resource grid may exist per the antenna port, subcarrier spacing, or transmission direction.

A resource block is constituted of 12 subcarriers and is defined only in the frequency domain. Further, the resource element is constituted of one OFDM symbol and one subcarrier. Therefore, as shown in FIG. 3, the size of one resource block may vary depending on the subcarrier spacing. Further, in NR, "point A", which serves as a common reference point for the resource block grid, and a common resource block and a virtual resource block are defined.

Figure 4:
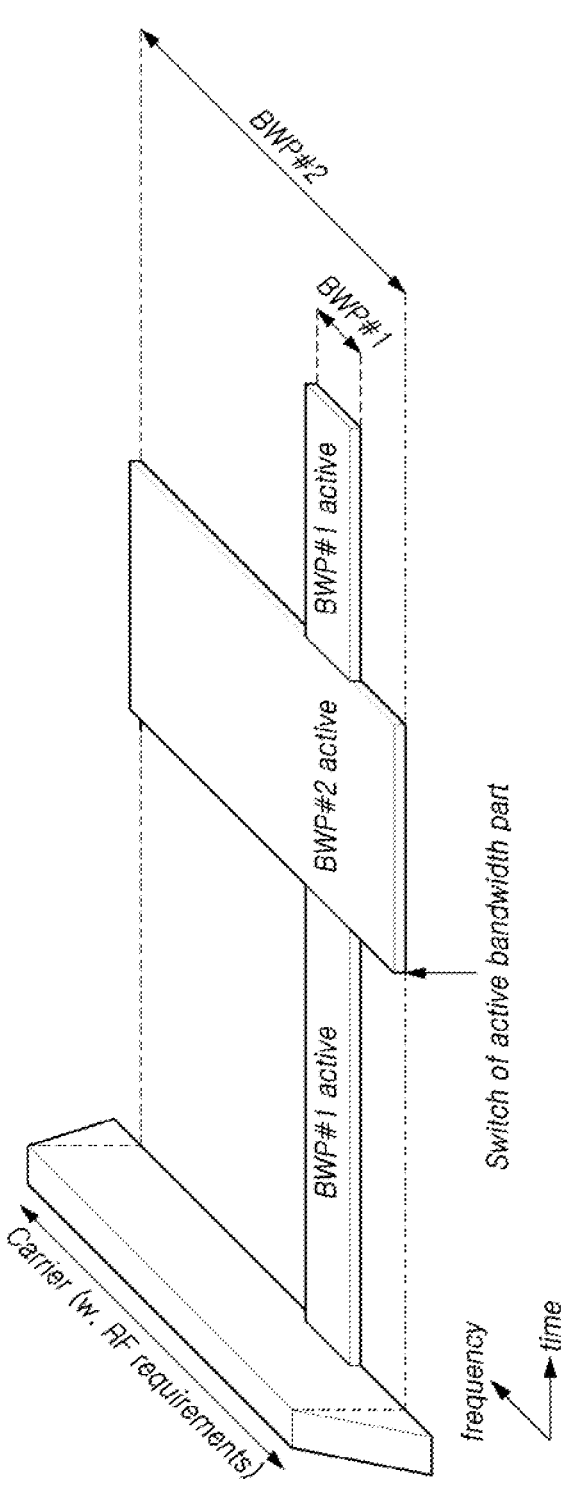
FIG. 4 is a view illustrating a bandwidth part supported by radio access technology.

FIG. 4 is a view illustrating a bandwidth part supported by radio access technology.

In NR, unlike LTE where the carrier bandwidth is fixed to 20 Mhz, the maximum carrier bandwidth is set from 50 Mhz to 400 Mhz for each subcarrier spacing. Therefore, it is not assumed that all UEs use all of these carrier bandwidths. Accordingly, in NR, as shown in FIG. 4, a bandwidth part (BWP) may be designated within the carrier bandwidth and used by the UE. Further, the bandwidth part is associated with one numerology and is composed of a subset of contiguous common resource blocks. The bandwidth part may be activated dynamically over time. In a UE, up to four bandwidth parts may be configured for each of uplink and downlink. Data is transmitted/received using the bandwidth part activated at a given time.

In the case of paired spectra, the uplink and downlink bandwidth parts are set independently. In the case of unpaired spectra, the bandwidth parts of uplink and downlink are set to make a pair to share the center frequency to prevent unnecessary frequency re-tunning between downlink and uplink operations.

<NR Initial Access>

In NR, a UE performs a cell search procedure and a random access procedure to access a base station and perform communication.

In the cell search procedure, a UE is synchronized with a cell of a base station using a synchronization signal block (SSB) transmitted from the base station, obtains a physical layer cell ID, and obtains system information.

Figure 5:
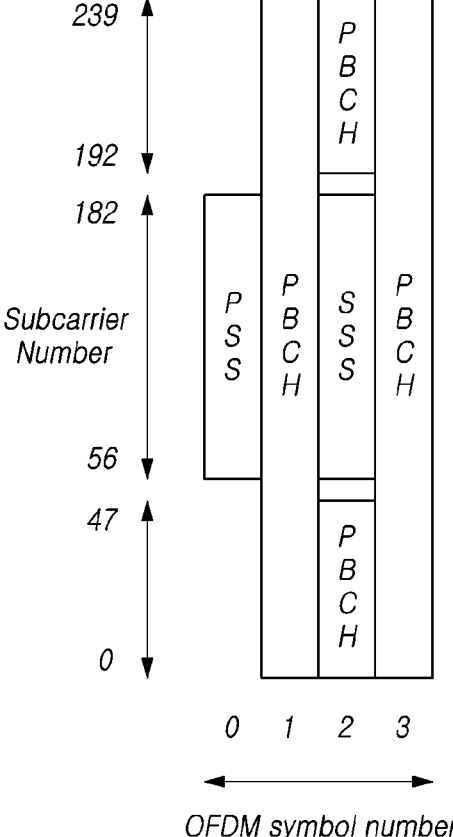
FIG. 5 is a view exemplarily illustrating a synchronization signal block in radio access technology.

FIG. 5 is a view exemplarily illustrating a synchronization signal block in radio access technology.

Referring to FIG. 5, a SSB is constituted of a primary synchronization signal (PSS) and a secondary synchronization signal (SSS) occupying one symbol and 127 subcarriers, respectively, and a PBCH spanning three OFDM symbols and 240 subcarriers.

The UE monitors the SSB in time and frequency domains and receives the SSB.

The SSB may be transmitted up to 64 times in 5 ms. Multiple SSBs are transmitted on different transmission beams within 5 ms, and the UE performs detection assuming that SSBs are transmitted every 20 ms period based on one specific beam used for transmission. The number of beams available for SSB transmission within 5 ms may increase as the frequency band increases. For example, up to 4 SSB beams may be transmitted below 3 GHz, SSBs may be transmitted using up to 8 different beams in a frequency band of 3 to 6 GHz, and up to 64 different beams in a frequency band of 6 GHz or higher.

One slot includes two SSBs. A start symbol and the number of repetitions within the slot are determined according to the subcarrier spacing as follows.

Meanwhile, the SSB is not transmitted at a center frequency of a carrier bandwidth unlike the SS of typical LTE. In other words, the SSB may be transmitted even in a place other than the center of the system band. In the case of supporting wideband operation, a plurality of SSBs may be transmitted in a frequency domain. Accordingly, the UE monitors the SSB by a synchronization raster, which is a candidate frequency location for monitoring the SSB. In NR, the carrier raster and synchronization raster are newly defined, and they are the center frequency location information about the channel for initial access. The synchronization raster has a wider frequency interval than the carrier raster in order to enable the UE for fast SSB search.

The UE may obtain a master information block (MIB) through a PBCH of a SSB. The master information block (MIB) includes minimum information for the UE to receive remaining system information (e.g., remaining minimum system information (RMSI)) broadcast by the network. Further, the PBCH may include information about the position of the first DM-RS symbol in the time domain, information for monitoring SIB1 by the UE (e.g., SIB1 numerology information, information related to SIB1 CORESET, search space information, PDCCH-related parameter information, etc.), offset information between the common resource block and the SSB (the absolute location of the SSB within the carrier is transmitted through SIB1), and the like. Here, the SIB1 numerology information is equally applied to messages used in the random access procedure for the UE to access the base station after completing the cell search procedure. For example, the numerology information about SIB1 may be applied to at least one of messages 1 to 4 for the random access procedure.

The above-described RMSI may be system information block 1 (SIB1). SIB1 is broadcast periodically (e.g., 160 ms) in the cell. SIB1 includes information necessary for the UE to perform an initial random access procedure, and SIB is periodically transmitted through the PDSCH. To receive SIB1, the UE needs to receive numerology information used for SIB1 transmission and control resource set (CORESET) information used for SIB1 scheduling through the PBCH. The UE identifies scheduling information for SIB1 using SI-RNTI in CORESET and obtains SIB1 on PDSCH according to scheduling information. The remaining SIBs except for SIB1 may be transmitted periodically and may be transmitted at the request of the UE.

Figure 6:
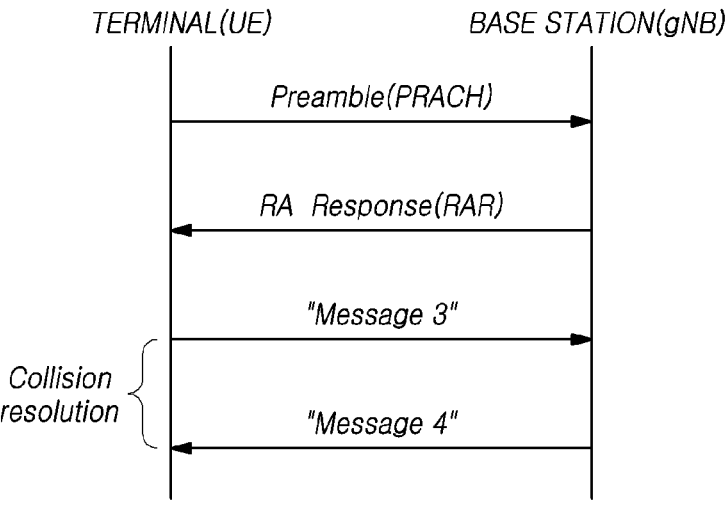
FIG. 6 is a view illustrating a random access procedure in radio access technology.

FIG. 6 is a view illustrating a random access procedure in radio access technology.

Referring to FIG. 6, when cell search is completed, a UE transmits a random access preamble for random access to a base station. The random access preamble is transmitted through PRACH. Specifically, the random access preamble is transmitted to the base station through the PRACH composed of contiguous radio resources in a periodically repeated specific slot. In general, when the UE initially accesses a cell, a contention-based random access procedure is performed, and when random access is performed for beam failure recovery (BFR), a non-contention-based random access procedure is performed.

The UE receives a random access response in response to the transmitted random access preamble. The random access response may include a random access preamble identifier (ID), uplink radio resource (UL grant), temporary cell-radio network temporary identifier (C-RNTI), and time alignment command (TAC). Since one random access response may include random access response information for one or more UEs, the random access preamble identifier may be included in order to indicate a UE related to the UL grant, temporary C-RNTI, and TAC included in the random access response. The random access preamble identifier may be an identifier for the random access preamble received by the base station. The TAC may be included as information for the UE to adjust uplink synchronization. The random access response may be indicated by the random access identifier on the PDCCH, that is, the random access-radio network temporary identifier (RA-RNTI).

Upon receiving a valid random access response, the UE processes information included in the random access response and performs scheduled transmissions to the base station. For example, the UE applies the TAC and stores the temporary C-RNTI. Further, the UE transmits data stored in the buffer of the UE or newly generated data to the base station using the UL grant. In this case, information that may identify the UE should be included.

Finally, the UE receives a downlink message for contention resolution.

<NR CORESET>

In NR, a downlink control channel is transmitted in a control resource set (CORESET) having a length of 1 to 3 symbols and transmits uplink/downlink scheduling information, slot format index (SFI), transmit power control (TPC) information, etc.

As such, NR introduced the concept of CORESET in order to secure the flexibility of the system. The control resource set (CORESET) refers to a time-frequency resource for a downlink control signal. The UE may use one or more search spaces in CORESET time-frequency resources to decode control channel candidates. A quasi co-location (QCL) assumption is configured and is used for the purpose of providing information on the characteristics of the analog beam direction, as well as, the latency spread, Doppler spread, Doppler shift, and average latency, which are characteristics assumed by the typical QCL.

Figure 7:
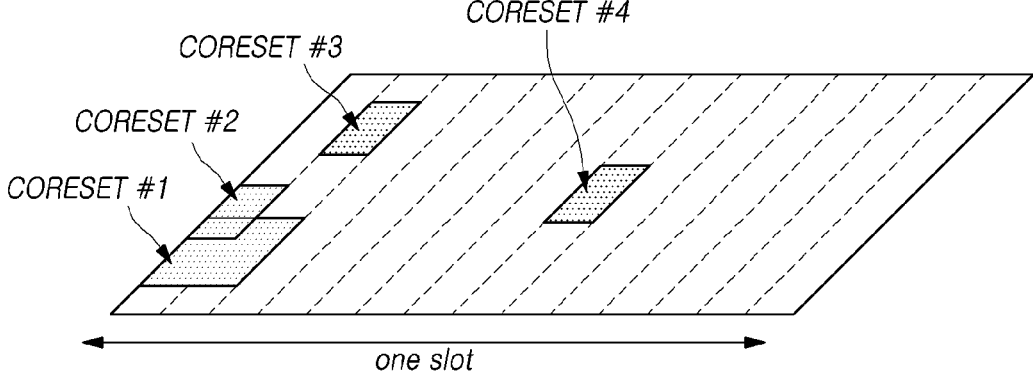
FIG. 7 is a view illustrating a CORESET.

FIG. 7 is a view illustrating a CORESET.

Referring to FIG. 7, the CORESET may exist in various forms within a carrier bandwidth within one slot. In the time domain, the CORESET may be constituted of up to 3 OFDM symbols. Further, the CORESET is defined as a multiple of 6 resource blocks up to the carrier bandwidth in the frequency domain.

A first CORESET, as a part of the initial bandwidth part, is designated (e.g., instructed, assigned) through an MIB in order to receive additional configuration information and system information from a network. After establishing a connection with the base station, the UE may receive and configure one or more CORESET information through RRC signaling.

In this specification, a frequency, a frame, a subframe, a resource, a resource block, a region, a band, a subband, a control channel, a data channel, a synchronization signal, various reference signals, various signals, and various messages related to new radio (NR) may be interpreted as meanings used in a present or in the past or various meanings to be used in the future.

NR (New Radio)

As described above, NR has been designed not only to provide an improved data transmission rate but also to satisfy various QoS requirements required for each of specified usage scenarios. In particular, the representative usage scenarios of NR may include enhancement mobile broadband (eMBB), massive MTC (mMTC), and ultra-reliable and low latency communications (URLLC). As a method for meeting the requirements for each usage scenario, a frame structure is designed to be flexible as compared with LTE. Each usage scenario has different requirements for data rates, latency, reliability, coverage, etc. Therefore, as a method to efficiently satisfy the requirements for each usage scenario through the frequency band of a NR system, it has been designed to efficiently multiplex radio resource units of different numerologies (e.g., subcarrier spacing, subframe, TTI, etc.).

For example, there has been discussion on i) a method for multiplexing numerologies each having a subcarrier spacings (SCS) value different from one another based on TDM, FDM, or TDM/FDM through one or more NR component carriers and ii) method for supporting one or more time units in configuring a scheduling unit in the time domain. In this regard, NR defines a subframe as one type of time domain structure. As reference numerology for defining the subframe duration, it is determined to define a single subframe duration composed of 14 OFDM symbols of normal CP overhead based on 15 kHz sub-carrier spacing (SCS) which is the same as that of LTE. Accordingly, in NR, the subframe has 1 ms time duration. However, unlike LTE, the subframe of NR is absolute reference time duration and, as a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Therefore, a slot is constituted of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in any numerology (or SCS), a mini-slot is defined to be constituted of a smaller number of symbols than the typical slot. For minislot-based uplink/downlink data transmission/reception, a short-length time-domain scheduling interval may be set, or a long-length time-domain scheduling interval for uplink/downlink data transmission/reception may be configured via slot aggregation. In particular, in the case where latency-sensitive data, such as URLLC, is transmitted or received, if scheduling is performed in slot units which are based on 1 ms (14 symbols) as defined in the numerology-based frame structure which has a small SCS value, e.g., 15 kHz, it is difficult to satisfy the latency requirements. Thus, a mini-slot constituted of a smaller number of OFDM symbols than the slot constituted of 14 symbols may be defined and, based thereupon, scheduling capable of meeting the URLLC requirements may be carried out.

Meanwhile, in NR, the default scheduling unit has been changed to a slot. Further, regardless of subcarrier-spacing, the slot consists of 14 OFDM symbols. In contrast, NR supports a non-slot structure configured of 2, 4, or 7 OFDM symbols, which is a smaller scheduling unit. The non-slot structure may be utilized as a scheduling unit for URLLC service.

MBMS (Multimedia Broadcast Multicast Service) in LTE Network

3GPP has developed LTE broadcast/multicast standards for video broadcasting from Rel-9. Since then, standards have been specified to support other services, such as public safety, the internet of thing (IoT), and vehicle to everything (V2X), in LTE. For NR, the Rel-15 and Rel-16 standards do not support MBMS. It is determined that MBMS-related standards should be further developed in the NR standard of the later release.

Meanwhile, in the LTE-based typical MBMS, two transmission schemes are provided: multimedia broadcast multicast service single frequency network (MBSFN) transmission; and single cell point to multipoint (SC-PTM) transmission.

The MBSFN transmission scheme is appropriate for providing media broadcasting in a large-scale pre-planned area (MBSFN area). The MBSFN area is statically configured. For example, this is configured by O&M. It may not be dynamically adjusted according to a user distribution. Synchronized MBMS transmission is provided within the MBSFN area, and combining is supported for MBMS transmission from a plurality of cells. Each MCH scheduling is performed by a multi-cell/multicast coordination Entity (MCE), and a single transport block is used for each TTI for MCH transmission. Further, the transport block uses the MBSFN resource in the subframe. MTCH and MCCH may be multiplexed on the same MCH. MTCH and MCCH use the RLC-UM mode. Even if all radio resources are not used in the frequency domain, unicast and multiplexing are not allowed in the same subframe. As such, the MBSFN transmission scheme is hard to dynamically adjust and apply to small-scale broadcast services.

The SC-PTM transmission scheme was developed to enhance the inefficiency of the MBSFN transmission scheme. MBMS is transmitted within single cell coverage through SC-PTM. One SC-MCCH and one or more SC-MTCHs are mapped to the DL-SCH. Scheduling is provided by the base station. SC-MCCH and SC-MTCH each are indicated by one logical channel-specific RNTI (SC-RNTI or G-RNTI) on the PDCCH. SC-MTCH and SC-MCCH use the RLC-UM mode. Although single transmission is used for the DL-SCH to which SC-MCCH and SC-MTCH are mapped, blind HARQ repetition or RLC repetition is not provided.

Figure 8:
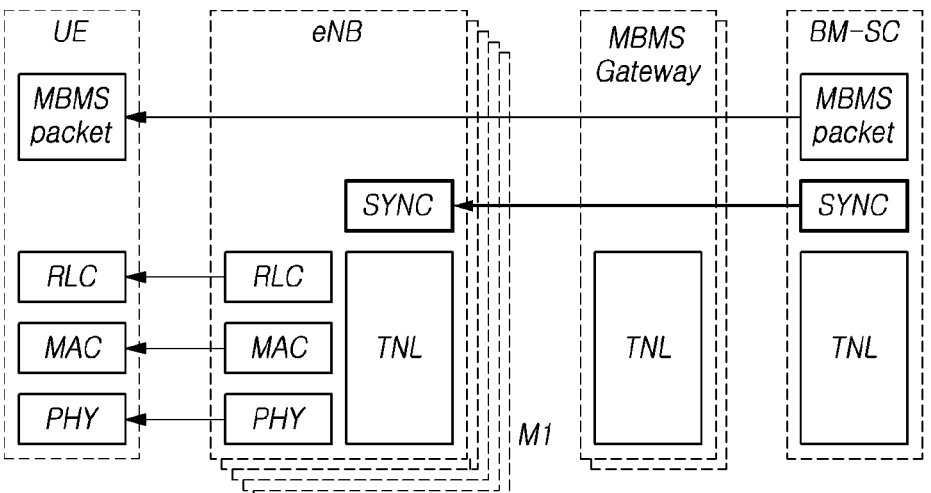
FIG. 8 is a view illustrating an MBMS user plane protocol architecture.

FIG. 8 is a view illustrating an MBMS user plane protocol architecture.

Referring to FIG. 8, in the LTE network, MBMS user data is transmitted between a broadcast multicast service center (BM-SC) and a UE through a mobile communication network. Accordingly, a corresponding packet may not be an IP packet. Further, only broadcast transmission scheme was supported in LTE MBMS. Therefore, the protocol structure was designed based on RLC-UM without using the PDCP layer that provides header compression or security functions.

Meanwhile, LTE-based MBMS supports only the broadcast mode. Even in a RRC idle state, a UE was able to receive MBMS data of interest by receiving and configuring radio resource configuration information for receiving MBMS through a control logical channel (MCCH/SC-MCCH) associated with MBMS-related system information. However, it was very difficult to accurately estimate the number of UEs receiving MBMS data for each cell. Accordingly, there was the issue that MBMS data was unnecessarily transmitted even in a cell with no UE receiving MBMS data.

As a method to address such issue, NR-based MBS (NR multicast and broadcast service) may require a UE to configure an RRC connection to receive MBMS data. The UE in a RRC idle state may configure an RRC connection and join a corresponding MBS/session, and the base station may indicate configuration information for MBS reception through a dedicated RRC message (e.g., RRC reconfiguration message) so that the UE may receive the MBS. The multicast mode may be configured to support feedback to the data transmitted based on the RRC connection to provide a reliable service.

However, it was burden for the network to support all services in the multicast mode that requires an RRC connection. Accordingly, it is necessary for NR-based MBS to support an operation for receiving data in a broadcast mode in a RRC idle/inactive state. Or, even in a multicast mode, it may be preferable to support an operation for receiving data in the RRC idle/inactive state of the UE. However, NR does not support of MBS providing method for the UE in the RRC idle/inactive state.

NR MBS (Multicast and Broadcast Services)

3GPP approved a task item for MBS based on 5G/NR in Rel-17. MBS denotes a multicast communication service and a broadcast communication service.

In a broadcast communication service, the same service and the same specific content data may be simultaneously provided to all UEs within one geographic area. All UEs within the broadcast coverage may be able to receive data. A broadcast communication service may be transferred to the UE using a broadcast session. In the case of the broadcast session, the UE may receive MBS data in RRC idle, RRC inactive, and RRC connected states.

In the multicast communication service, the same service and the same specific content data may be simultaneously provided to a designated set of UEs. Not all UEs within multicast coverage are authorized for data reception. A multicast communication service may be transferred to the UE using a multicast session. In the case of the multicast session, the UE may receive MBS data in an RRC connected state.

For the multicast service, the base station may transfer the MBS data packet using the following method.

PTP (Point To Point) transmission: The base station separately transfers separate copies of the MBS data packet. The base station may schedule the UE-specific PDSCH using the UE-specific PDCCH that is CRC-scrambled by the UE-specific RNTI (e.g., C-RNTI). The UE-specific PDSCH is scrambled with the same UE-specific RNTI (e.g., C-RNTI).

PTM (Point To Multipoint) transmission: The base station transfers a single copy of the MBS data packet to a set of UEs. The base station may schedule the group common PDSCH using a group common PDCCH that is CRC-scrambled by a group common RNTI (e.g., G-RNTI of LTE SC-PTM). The group common PDSCH is scrambled with the same group common RNTI.

The base station may dynamically determine whether to transmit multicast data by PTM or PTP for one UE. The base station may dynamically schedule multicast data to be transmitted, and the base station transmit the data to the UE. Meanwhile, it may be preferable to deactivate a specific multicast session while multicast data is not transmitted to the UE for a specific multicast session to efficiently use network resources.

However, there is no specific method for controlling activation/deactivation of a multicast session. In particular, no method has been introduced for controlling operations according to the activation/deactivation of a multicast session over a wireless network.

As described above, there is a demand for a method of a UE for receiving MBS in a RRC idle/inactive state in NR. Further, it may be preferable to deactivate a specific multicast session not to consume radio resources while multicast data is not transmitted to the UE for the specific multicast session. Accordingly, it is needed to provide a method for controlling activation/deactivation of a multicast session over a wireless network.

The present embodiments devised to address such issues introduce a method of an RRC idle/inactive UE for effectively receiving and processing MBS data. The present embodiments also introduce a control method for supporting an activation/deactivation function for a multicast session.

Hereinafter, a technique (e.g., method and device) for providing an NR radio access technology-based multicast/broadcast service (MBS) according to the embodiments will be described. However, this is for convenience of description, and the disclosure may be applied to any radio access technology (e.g., LTE or 6G). The embodiment described in the disclosure may include the content of information elements and operations set forth in TS 38.321, the 3GPP NR MAC standard, and TS 38.331, the NR RRC standard. Although the disclosure does not contain the content of the UE operation related to the detailed definitions for the corresponding information elements, the content set forth in the standards may be incorporated in the disclosure.

For convenience of description, the following description focuses primarily on a method for a UE in the RRC idle/inactive state to receive a broadcast-based MBS. However, this is merely for convenience of description, and the present embodiments may also be applicable to multicast-based MBS. Further, the present embodiments may also apply to UEs in the RRC connected state.

Figure 9:
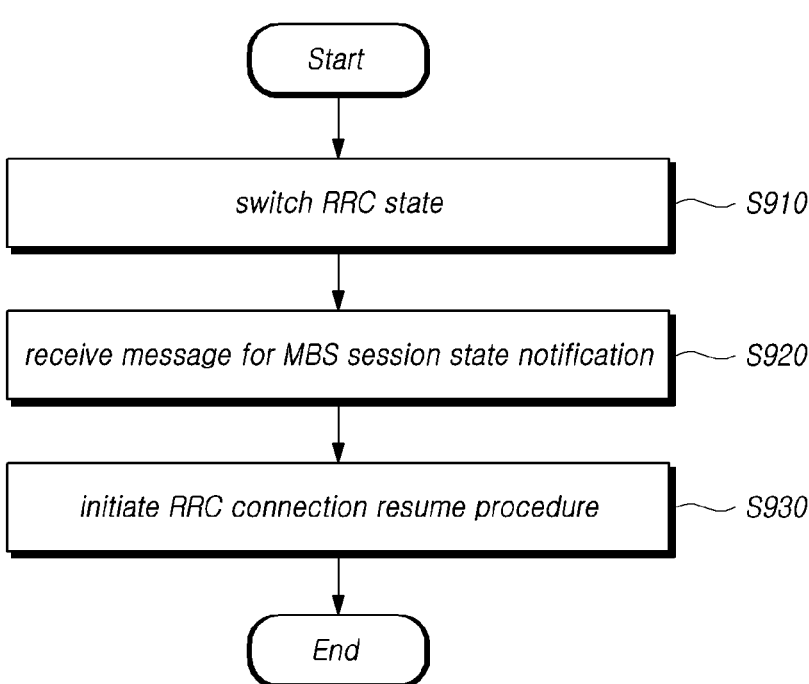
FIG. 9 is a flowchart illustrating operations of a UE according to an embodiment.

FIG. 9 is a flowchart illustrating operations of a UE according to an embodiment.

Referring to FIG. 9, a UE processing multicast and broadcast services (MBS) data may perform a state switching step to switch a RRC state to a RRC inactive state (S910).

According to an embodiment, the UE may switch the RRC state to the RRC inactive state according to the instruction of the base station or trigger of the higher layer of the UE. The UE may switch from the RRC connected state or RRC idle state to the RRC inactive state.

According to another embodiment, when the UE switches to the RRC inactive state, the MBS radio bearer for the MBS session may be suspended. In other words, the UE may suspend the MBS radio bearer, configured in the UE, to receive MBS data while switching to the RRC inactive state.

According to still another embodiment, the UE may receive an RRC connection release message including information for instructing whether to activate the MBS session from the base station before switching to the RRC inactive state. The information for instructing whether to activate the MBS session means information for instructing to activate or deactivate the MBS session configured in the UE. The information may be received by the UE through the RRC connection release message. Upon receiving the RRC connection release message, the UE may switch its state from the RRC connected state to the RRC inactive state or RRC idle state. Further, the UE may activate or deactivate the MBS session configured in the UE, based on the information for instructing whether to activate the MBS session.

The UE may receive a message for MBS session state notification from the base station (S920).

According to an embodiment, the MBS session state notification may be any one of an initiate notification for at least one MBS session, a change notification for at least one MBS session, and an activate notification for at least one MBS session. The MBS session initiate notification may mean notification to initiate MBS data transmission for the corresponding MBS session or notification to initiate transmission of configuration information for the corresponding MBS session. The MBS session change notification may mean notification to change, e.g., configuration information for the corresponding MBS session. Or, the MBS session activate notification may mean notification of activation or deactivation of the corresponding MBS session.

The message for the MBS session state notification may include one or more pieces of MBS session identification information. Further, the message for MBS session notification (e.g., MBS session instruction) may be a paging message. The MBS session identification information may be included in the form of a list. For example, the MBS session identification information may include at least one of temporary mobile group identity (TMGI), MBS session ID, and IP multicast address information.

The UE may identify the initiate/change/activate notification of the MBS session of interest through the above-described message.

The UE may initiate a RRC connection resume procedure for switching the RRC state based on the message (S930).

For example, upon receiving the MBS session notification (e.g., MBS session instruction) through the above-described message, the UE may initiate the RRC connection resume procedure to switch the state from the RRC inactive state to the RRC connected state. The RRC connection resume procedure may be triggered by the UE's higher layer.

According to an embodiment, upon receiving the paging message for MBS session notification (e.g., MBS session instruction), the UE identifies the MBS session identification information included in the paging message. When joining the MBS session included in the paging message, the UE may trigger initiation of the RRC connection resume procedure to switch to the RRC connected state.

Thus, even in the RRC idle or RRC inactive state, the UE may receive the initiate/change/activate notification for the MBS session that it joins through the paging message. Further, the UE may switch the RRC state only when necessary based on the notification for the MBS session, preventing unnecessary power consumption.

Figure 10:
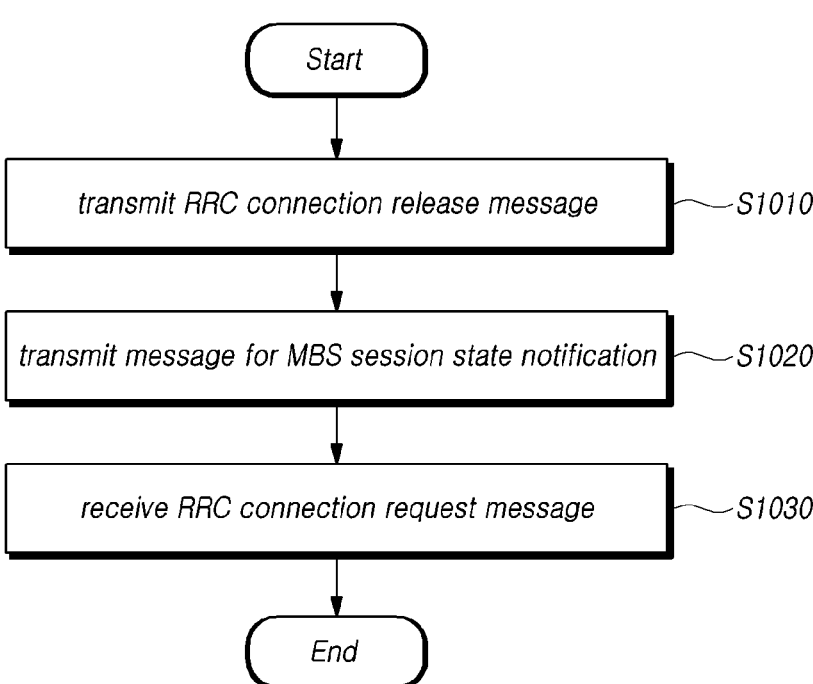
FIG. 10 is a flowchart for describing operations of a base station according to an embodiment.

FIG. 10 is a flowchart for describing operations of a base station according to an embodiment.

Referring to FIG. 10, the base station controlling multicast/broadcast services (MBS) processing of the UE may transmit, to the UE, an RRC connection release message including information to instruct whether to activate the MBS session (S1010).

According to an embodiment, the information for instructing whether to activate the MBS session means information for instructing to activate or deactivate the MBS session configured in the UE. The information may be transmitted to the UE through the RRC connection release message. Upon receiving the RRC connection release message, the UE may switch its state from the RRC connected state to the RRC inactive state or RRC idle state. Further, the UE may activate or deactivate the MBS session configured in the UE, based on the information for instructing whether to activate the MBS session.

According to an embodiment, the UE may switch the RRC state to the RRC inactive state according to the instruction of the base station or according to trigger of the higher layer of the UE. The UE may switch from the RRC connected state or RRC idle state to the RRC inactive state.

According to another embodiment, when the UE switches to the RRC inactive state, the MBS radio bearer for the MBS session may be suspended. In other words, the UE may suspend the MBS radio bearer, configured in the UE, to receive MBS data while switching to the RRC inactive state.

When the UE has switched to the RRC inactive state, the base station may transmit a message for MBS session state notification to the UE (S1020).

For example, the MBS session state notification may be any one of an initiate notification for at least one MBS session, a change notification for at least one MBS session, and an activate notification for at least one MBS session. The MBS session initiate notification may mean notification to initiate MBS data transmission for the corresponding MBS session or notification to initiate transmission of configuration information for the corresponding MBS session. The MBS session change notification may mean notification to change, e.g., configuration information for the corresponding MBS session. Or, the MBS session activate notification may mean notification of activation or deactivation of the corresponding MBS The message for the MBS session state notification may include one or more pieces of MBS session identification information. Further, the message for MBS session notification (e.g., MBS session instruction) may be a paging message. The MBS session identification information may be included in a form of a list. For example, the MBS session identification information may include at least one of temporary mobile group identity (TMGI), MBS session ID, and IP multicast address information.

The base station may perform the initiate/change/activate notification of the MBS session of interest to the UE through the above-described message.

When the UE initiates the RRC connection resume procedure based on the message, the base station may receive an RRC connection request message from the UE (S1030).

Upon receiving the MBS session notification (e.g., MBS session instruction) through the above-described message, the UE may initiate the RRC connection resume procedure to switch the state from the RRC inactive state to the RRC connected state. The RRC connection resume procedure may be triggered by the UE's higher layer. If the RRC connection resume procedure is initiated, the base station may receive the RRC connection request message from the UE. The RRC connection request message may include information for requesting to switch the connection state from the RRC inactive state to the RRC connected state.

According to an embodiment, upon receiving the paging message for MBS session notification (e.g., MBS session instruction), the UE identifies the MBS session identification information included in the paging message. When joining the MBS session included in the paging message, the UE may trigger initiation of the RRC connection resume procedure to switch to the RRC connected state.

Thus, even in the RRC idle or RRC inactive state, the UE may receive the initiate/change/activate notification for the MBS session that it joins through the paging message. Further, the UE may switch the RRC state only when necessary based on the notification for the MBS session, preventing unnecessary power consumption.

As described above, the UE and the base station may control whether to activate the MBS session that the UE joins. Further, the UE and the base station may control the MBS session based on the MBS notification while preventing the UE from unnecessary power consumption even in a non-RRC connected state. Hereinafter, specific detailed embodiments for MBS session control which may be performed by the above-described UE and base station will be described.

The following detailed embodiments may be performed by the UE and the base station individually or in any combination.

First, a detailed embodiment in which a base station performs instructing a MBS session (e.g., MBS session notification or MBS session instruction) and a UE receives MBS data according to the MBS session notification (e.g., MBS session instruction) will described.

Embodiment of Notifying (e.g., Informing, Indicating) of MBS Session/Configuration Change Through Paging Message The MBS configuration information for the RRC idle/inactive UE to receive MBS data may be indicated (e.g., provided, transmitted, instructed, notified) through MBS-related system information and/or MBS control logical channel.

According to an embodiment, the MBS configuration information/configuration parameter for receiving MBS data may be indicated (e.g., provided, transmitted, instructed, notified) through the MBS control logical channel. According to another embodiment, all/most common MBS control information/configuration parameters for MBS data reception may be indicated (e.g., instructed, notified, informed, transmitted, or provided) through the SIB on the BCCH.

The method for indicating (e.g., providing, transmitting, instructing, notifying) all/most common MBS control information/configuration parameters for MBS data reception through the SIB only may affect other UEs which are not interested in receiving the MBS when system information is changed due to a change in any parameter related to the MBS session. For example, even for the UE which is not interested in receiving the MBS, if the UE is notified of a system information change, it should be checked whether a change is made to any system information related to the UE regardless of whether the UE is interested in receiving the MBS. Accordingly, it may be preferable to transfer most MBS configuration information/configuration parameters for MBS data reception through the MBS control logical channel. However, this method also requires a method for the UE interested in the MBS session to identify and receive at an appropriate time when any MBS configuration parameter for MBS data reception is changed.

When the MBS is initiated/modified, the network/base station may notify/instruct the RRC idle/inactive UE interested in MBS reception to obtain the corresponding MBS configuration to receive the MBS at an appropriate time and initiate MBS reception or to receive the service using the changed configuration information.

According to an embodiment, the network may allow the UE in the RRC idle/inactive state to configure an RRC connection to receive the corresponding MBS configuration through paging. According to another embodiment, the network may allow the UE in the RRC idle/inactive state to receive the MBS configuration in an on-demand fashion through paging. According to further another embodiment, the network may allow the UE in the RRC idle/inactive state to receive (in the next period) the MBS configuration (e.g., MBS control logical channel) periodically broadcast.

Meanwhile, when many UEs are interested in any MBS session in one cell/base station, it may be inefficient to perform paging for each individual UE to notify of MBS configuration initiation/change. In contrast, it may be preferable to provide information for triggering acquisition/reception for a specific MBS configuration when performing paging. Thus, it is possible to allow only UEs interested in the corresponding MBS session to perform the following operations to receive the corresponding configuration. To that end, the network (base station) may provide corresponding MBS session information when performing paging. Or, when performing paging, the network may also provide the notification that the paging is performed due to the initiation/modification/change to the MBS to all the UEs or grouped UEs in the cell. To that end, as described above, the base station may transmit an MBS state notification to the UE through a paging message. Thus, the UEs interested in the MBS session may identify the same and perform the following operations for receiving the MBS configuration.

According to an embodiment, the base station may include information indicating that the paging is for notifying of a change in the MBS configuration in the paging DCI. For example, the base station may include information for notifying of a change in the MBS configuration in the paging message. Or, the base station may include MBS session information in the paging DCI. Or, the base station may include MBS session information in the paging message.

According to another embodiment, the paging message may include MBS configuration information. The UE receiving the same may receive the corresponding MBS by applying the MBS configuration information.

According to still another embodiment, the MBS session may classified based on any criterion to reduce paging overhead. For example, the MBS session may be classified in association with any (5G) QoS parameter. As another example, the MBS session may be classified on the MBS session identifier. As another example, the MBS session may be classified through modular operation. The corresponding information may be (previously) indicated through MBS-related system information or MBS control logical channel or RRC dedicated message. Or, the corresponding information may be included and transmitted in the paging DCI or paging message.

According to yet another embodiment, the MBS control channel change may be notified of through the paging message. The base station may notify of the MBS control channel change through the paging message. For example, the base station may notify of the MBS control channel change through a short message. The short message may be masked using the P-RNTI and transmitted on the PDCCH. The short message may also be transmitted using a short message field in DCI format 1_0.

FIG. 11 is a view illustrating a short message bit of a paging message according to an embodiment.

Referring to FIG. 11, one, two, or three bits of the short message are allocated for separate indication information. Accordingly, an MBS control channel change may be notified of using one (or more) bit among the bits (e.g., 4-8) not used in the short message. Or, the MBS control channel change notification may be indicated using one or more bits among the bits (e.g., 4-8) not used in the short message. Upon receiving the paging message (or short message), the UE may recognize the change and receive and apply the MBS control channel. The UE may transfer and apply the message to the higher layer and receive MBS data. Otherwise, the UE may perform an operation for receiving and processing a paging message according to the typical art.

According to another embodiment, the base station may transmit the MBS control channel configuration through the paging message. The base station may notify of the MBS control channel change through the paging message. Or, the base station may transmit the MBS control channel (MBS configuration) through the paging message. For example, the base station may notify of the MBS control channel change or instruct MBS control channel transmission through the short message. The short message may be masked using the P-RNTI and transmitted on the PDCCH. Or, the short message may be masked using the RNTI distinguished from the P-RNTI and transmitted on the PDCCH. The short message may be transmitted with an associated paging message. The short message may be transmitted using a short message field in DCI format 1_0. As shown in FIG. 11, the base station may notify of the MBS control channel change or instruct transmission of the changed MBS configuration using one or more bits among the bits (e.g., 4-8) not used in the short message. The associated paging message may include the MBS configuration (configuration information/parameters for MBS data reception). Upon receiving the paging message (or through the paging message when receiving the short message), the UE may receive and apply the MBS control channel. Or, the UE may transfer and apply the message to the higher layer and receive MBS data. Otherwise, the UE may perform operations for receiving and processing a paging message according to the typical art.

According to another embodiment, the MBS control channel change for a specific MBS session may be notified of through the paging message. The base station may notify of the MBS control channel change for the specific MBS session through the paging message. For example, the base station may notify of the MBS control channel change through a short message. The short message may be transmitted on the PDCCH, using the P-RNTI. The short message may also be transmitted using a short message field in DCI format 1_0. The base station may instruct the MBS control channel change notification using one or more bits among the bits (e.g., 4-8) not used in the short message. Information for identifying the MBS session may be included on the paging record of the associated paging message. Or, the MBS session may be included in the form of an identification information list/bitmap. Upon receiving the paging message (or short message), the UE interested in the MBS session may receive and apply the MBS control channel for the MBS session. Or, the UE may transfer and apply the message to the higher layer and receive MBS data. Otherwise, the UE may perform an operation for receiving and processing a paging message according to typical art.

FIG. 12 is a view illustrating an information element included in a paging message according to an embodiment.

Referring to FIG. 12, the paging message may include a UE identifier, and optionally access type, on the paging record. To notify of the MBS control channel change per MBS session, the paging record may change the UE identifier into optional information not to provide it. The paging message may include information for identifying the MBS session on the paging record. Or, the paging message may include the MBS session in the form of an identification information list/bitmap.

According to another embodiment, the core network may notify the user interested in the MBS of MBS initiation/change. The access and mobility management function (AMF) may notify the user interested in the MBS of the MBS initiation/change through individual paging based on, e.g., assistance/request/join information received from the UE or the subscription information. Or, the AMF may perform paging in a specific MBS area based on, e.g., the assistance/request/join information received from the UE or the subscription information to notify any user interested in the MBS of the MBS initiation/change in the area. When there are many users interested in the MBS in one cell, it may be preferable to notify the UE group interested in the service of MBS initiation/change, rather than individual paging. To that end, identification information about the MBS session may be included in the paging message. The UE having transmitted the assistance/request/join information about the MBS or the user interested in the MBS, upon receiving the paging message (or through the paging message if receiving the short message), may receive and apply the MBS control channel/MBS configuration. Or, the UE may transfer and apply the message to the higher layer and receive MBS data. Otherwise, the UE may perform an operation for receiving and processing a paging according to the typical art.

According to another embodiment, the UE receiving the paging message may trigger or not perform the RRC connection setup/resume procedure. In the related art, if a UE receives a paging message, this is indicated to the higher layer, and the higher layer performs an RRC connection setup/resume procedure. If many UEs perform an RRC connection setup/resume procedure for MBS reception, this may abruptly increase network loads. Accordingly, when information for triggering MBS reception for the UE/UE group is included on the paging record, the UE receiving the paging message identifies whether the included UE identifier matches the UE identifier allocated by the higher layer or the stored I-RNTI of the UE. When matching, the UE may stop the RRC setup/resume procedure from being triggered. For example, the UE may stop the UE identifier from being forwarded to the higher layer. Or, the paging message may be configured not to include the (individual) UE identifier. Or, the paging message may be addressed through an RNTI other than the P-RNTI.

According to another embodiment, the base station may indicate a modified/changed MBS configuration through a dedicated RRC reconfiguration message for one or more UEs in the RRC connected state receiving multicast-based MBS data. This is a basic method for the RRC connected UE, but is inefficient if the number of UEs receiving the MBS in one cell is not large. Therefore, even for the UE in the RRC connected state, the modified/changed MBS configuration may be indicated through the system information or MBS control logical channel. There may be a need for a mechanism to notify of a modification/change to the MBS configuration for the UE to effectively receive the MBS configuration information. A multicast-based MBS requiring high reliability and low latency may need a rapid notification mechanism.

For example, information for instructing the UE to receive the MBS control logical channel or system information may be included on any L1 downlink signal/channel (e.g., DCI, paging DCI, PDCCH, or PDSCH). The UE receiving the instruction information may receive the modified/changed MBS configuration through the system information or MBS control logical channel. Scheduling information for the UE to receive the L1 downlink signal/channel (period/repetition period, radio frame offset (e.g., SFN mod period), or slot/slot offset/first slot number where the information is scheduled in each radio frame) and/or RNTI may be (previously) indicated and configured to the UE by the base station or may be previously configured as a fixed value.

Embodiment of Configuring a Valid MBS Configuration Information Area for MBS If a UE configures an RRC connection for MBS reception, if the UE receives the MBS configuration in an on-demand fashion, or if the UE receives the MBS configuration in a broadcast scheme whenever the UE reselects a cell, it may not be preferable in light of UE power consumption or signaling overhead. Further, it may be difficult to support service continuity for a UE in a RRC idle state or a RRC inactive state.

For some services provided in broadcast mode, such as broadband broadcast, MBS data may be transmitted for a specific area for a predetermined time. In such a case, although the UE reselects a cell, data may be received using the same MBS configuration for the same MBS if the cell is in a predesignated area.

If a cell, where the MBS configuration information applied to the previous cell is applicable as it is, is reselected when performing cell reselection as the RRC idle/inactive UE moves, it is possible to continuously receive a service.

According to an embodiment, the MBS control logical channel (MBS configuration information transmitted through the MBS control logical channel) may be identically configured in a plurality of cells. The MBS-related system information including information for receiving the MBS control logical channel may include information for indicating that the MBS control logical channel is identically configured in the plurality of cells. The MBS-related system information may include cell list information (or any cell identifier (phycellId or CellGlobalId list) where the MBS control logical channels are identical (valid). The information may be configured to have a unique value in one PLMN.

For example, if a specific cell is included in the same (valid) cell list information included in the MBS control logical channel information version stored in the UE and/or MBS-related system information version stored in the UE, the UE may consider the MBS-related system information stored for the cell as valid. And/or the UE may consider the MBS control channel information stored for the cell as valid. Accordingly, the UE need not perform a separate procedure for obtaining the MBS system information and related MBS control channel information upon cell reselection.

According to another embodiment, if the cell list information where the MBS control logical channel is the same (valid) is included on the MBS control logical channel information and/or MBS-related system information of the cell, and the cell is included in the cell list information where the MBS control logical channel stored in the UE is the same (valid), the UE may consider the MBS-related system information stored for the cell as valid. And/or the UE may consider the MBS control channel information stored for the cell as valid. Accordingly, the UE need not perform a separate procedure for obtaining the MBS system information and related MBS control channel information upon cell reselection.

According to another embodiment, the MBS control logical channel may be configured area-specifically. The MBS-related system information including information for receiving the MBS control logical channel may include information for indicating that the MBS control logical channel is configured area-specifically. Or the MBS-related system information may include information for identifying the MBS control logical channel area where the cell belongs. The information may be configured to have a unique value in one PLMN.

For example, for any MBS session in the cell(s) configured area-specifically, the MBS configuration for the MBS session may be considered to have the same MBS configuration. One MBS control logical channel (MBS configuration information/configuration message transmitted through the MBS control logical channel) may be indicated by including configuration information about one or more MBS sessions configured area-specifically.

According to another embodiment, information for indicating that the MBS control logical channel is configured area-specifically may be included on the MBS-related system information (or MBS control logical channel information) of the cell. The MBS-related system information may include information for identifying the MBS control logical channel area where the cell belongs. The information for identifying the MBS control logical channel area may be constituted of one or more cells. If the information for indicating that the MBS control logical channel received through the MBS-related system information (or MBS control logical channel information) from the serving cell is configured area-specifically is identical to the stored version value of the MBS-related system information (or MBS control logical channel information), and the information for identifying the MBS control logical channel area received through the MBS-related system information (or MBS control logical channel information) from the serving cell is identical to the stored version of the MBS-related system information (or MBS control logical channel information), the UE may consider the MBS-related system information stored for the cell as valid. And/or the UE may consider the MBS control channel information stored for the cell as valid. Accordingly, the UE need not perform a separate procedure for obtaining the MBS system information and related MBS control channel information upon cell reselection.

However, in this case, if some of the MBS sessions provided per cell differ from the other, application of the same may be limited.

According to another embodiment, for each MBS session in the cell(s) configured area-specifically, the MBS configuration for the MBS session may be considered to have the same MBS configuration. One MBS control logical channel (MBS configuration information/configuration message transmitted through the MBS control logical channel) may be indicated by including configuration information about one MBS session configured area-specifically.

According to another embodiment, information for indicating that the MBS control logical channel is configured area-specifically may be included on the MBS-related system information (or MBS control logical channel information) of the cell, for each MBS session. The MBS-related system information (or MBS control logical channel information) may include information for identifying the MBS control logical channel area where the cell belongs, for each MBS session. The information for identifying the MBS control logical channel area may be constituted of one or more cells. If the information for indicating that the MBS control logical channel, for each MBS session, received through the MBS-related system information (or MBS control logical channel information) from the serving cell is configured area-specifically is identical to the stored version value of the MBS-related system information (or MBS control logical channel information), and the information for identifying the MBS control logical channel area, for each MBS session, received through the MBS-related system information (or MBS control logical channel information) from the serving cell is identical to the stored version of the MBS-related system information (or MBS control logical channel information), the UE may consider the MBS-related system information stored for the cell as valid. And/or the UE may consider the MBS control channel information stored for the cell as valid. Accordingly, the UE need not perform a separate procedure for obtaining MBS system information and related MBS control channel information for the MBS session upon cell reselection.

Embodiment of Receiving MBS Data by Receiving MBS Configuration Through System Information or MBS Control Logical Channel when it is Difficult to Receive Multicast The multicast-based MBS may be basically received by the UE in the RRC connected state. For example, the multicast-based MBS requiring low latency and high reliability may provide a stable service under the control of the base station in the RRC connected state.

The base station may indicate, to the UE in the RRC connected state, the MBS configuration through an RRC dedicated message, and the UE may receive MBS data based thereupon. The base station may efficiently transmit MBS data according to the context (e.g., the number of UEs connected to the base station or base station loads) for the RRC connected UE. For example, the base station may efficiently transmit MBS data by applying, e.g., uplink HARQ feedback or ROHC PTM-PTP switching in the RRC connected state.

However, for any reason, the UE to receive the multicast-based MBS may have difficulty in receiving the MBS data. Or, for any reason, the UE to receive the multicast-based MBS may have difficulty in making an RRC connection. For example, when the UE is prohibited from access due to an overload limit to the base station, RRC connection may be difficult. Such a case may arise where the UE fails to configure an RRC connection and receive the MBS configuration and thus has difficulty in receiving MBS data for any reason. For example, it may be impossible to join the MBS to receive MBS session data in various cases, such as failure in random access due to, e.g., base station overload, reception of backoff time through random access response message, backoff time/timer operation, access barring according to the UAC, reception of RRC reject message, and operation of the wait time timer.

To reduce MBS reception delay, the UE may receive the MBS configuration through the MBS-related system information or MBS control logical channel to receive MBS data. Or, the UE may receive MBS data using the stored MBS configuration. Or, the UE may receive MBS data by maintaining/applying the previous MBS configuration applied through the RRC reconfiguration message. Or, the UE may receive the MBS configuration through the MBS-related system information or MBS control logical channel in an on-demand fashion to receive MBS data.

Thereafter, when the UE is able to set up/resume the RRC connection (e.g., release of the above-described reason, entering in-coverage, release of access barring according to the UAC, expiration of the wait time timer, or reception of RRC connection/resume instruction from the higher layer), the UE may set up/resume the RRC connection to receive the MBS configuration from the base station and apply it to receive MBS data.

Hereinafter, more various embodiments will be described. Method for Receiving MBS Data by Maintaining/Storing the Configuration Applied Through RRC Dedicated Message in RRC Idle/Inactive State MBS reception may be provided for the UE in the RRC idle/inactive state. For example, for the broadcast-based MBS, the UE in the RRC connected state may transmit interest/request/subscription/join information to the base station in the MBS session and receive MBS configuration information through the RRC dedicated message and may receive MBS data. Thereafter, the UE may switch to the RRC idle/inactive state. In the related art, the UE in the RRC connected state releases all the radio resources configured/established through the RRC dedicated message in the RRC connected state when switching to the RRC idle state. In section 5.3.11 of TS 38.331, the related RRC operation is described as follows.

"UE shall release all radio resources, including release of the RLC entity, the BAP entity, the MAC configuration and the associated PDCP entity and SDAP for all established RBs"

However, it may be preferable that the UE in the RRC idle/inactive state receives the MBS by using the configuration/setting information that has been applied by receiving the RRC reconfiguration message in the RRC connected state. To efficiently/continuously perform MBS data reception, the UE receiving MBS data may receive MBS data by storing/maintaining/using the MBS configuration information configured through the RRC dedicated message when switching to the RRC idle state (in the serving cell).

As another example, similar to the typical MBMS technology, for the broadcast-based MBS, the MBS configuration (configuration information) may be indicated through the MBS-related system information and/or MBS control logical channel for the RRC idle/inactive UE (or regardless of the RRC state, i.e., all UEs, or RRC idle/inactive/connected UEs). In other words, the RRC state change may trigger no change in the MBS configuration. The UE may receive a corresponding configuration through the MBS-related system information and/or MBS control logical channel for a specific MBS (MBS in the broadcast mode) regardless of the RRC state, receiving data.

As another example, for the broadcast-based MBS (or for the multicast-based MBS), part (e.g., common configuration information) of the MBS configuration for the RRC idle/inactive UE may be indicated through the MBS-related system information and/or MBS control logical channel. Part (e.g., individual configuration information) of the MBS configuration for the RRC idle/inactive UE may be indicated through an RRC dedicated message through the RRC connection. If the UE receives the MBS configuration parameters through both the MBS-related system information and/or MBS control logical channel and the RRC dedicated message, the UE may prioritize the information received through the RRC dedicated message. If the RRC idle/inactive UE performs cell change/cell reselection, the UE may update it with the MBS configuration indicated through the MBS-related system information and/or MBS control logical channel received in the cell. Other information (information not indicated) may be maintained in the UE. Or, the UE may receive an RRC dedicated message through the RRC connection and receive the information through the RRC dedicated message.

To that end, an MBS context may be defined and maintained/stored. The UE may maintain the timer to restrict application of the MBS context. The UE may start the timer when switching to the RRC idle state. The UE may release/remove the MBS context if the timer expires.

Meanwhile, it may be hard to provide a free reception-only service in the cellular mobile communication network that is used by the operator by paying for frequency. Accordingly, to allow the UE to receive the MBS in the RRC idle/inactive state on a specific PLMN, the UE may require authentication/verification for MBS subscription in the previous RRC connected state. The UE, which is authenticated/verified for MBS by the network (any network entity) in the RRC connected state, may store corresponding indication information (e.g., MAC, authentication key, decoding key, specific sequence, or token). The UE may receive the MBS even in the switched RRC idle/inactive state. For example, the UE may receive information for indicating MBS receivable/authentication through any NAS procedure (e.g., registration procedure (TAU)). The UE receiving the information may receive MBS data in the RRC idle/inactive state.

Or, the base station may transmit the information for indicating MBS receivable/authentication to the UE through an RRC release message. The base station may encode and transmit data using the information, and the UE may decode the data using the same. Or, the AMF may transmit the information for indicating MBS receivable/authentication to the UE.

The message including the information for indicating MBS receivable/authentication may include information (e.g., timer value) for limiting the receivable/authentication time. Upon receiving the information, the UE may start the timer set with the value. If the timer expires, the UE may perform a NAS procedure (or RRC connection setup/resume procedure) to authenticate MBS reception.

As another example, the base station may identify and indicate the MBS session requiring service authentication. For example, the base station may indicate the information through the system information or MBS control logical channel for indicating the MBS data reception configuration.

Embodiment for Indicating Additional Configuration Information (e.g., BWP) for Receiving MBS Data Based on NR and Related Operations As described above, the MBS configuration information for the RRC idle/inactive UE to receive MBS data may be indicated through MBS-related system information and/or MBS control logical channel.

According to an embodiment, information necessary to receive the MBS control logical channel on the BCCH/SIB may be indicated. As an example, the BCCH/SIB is scheduling information for receiving the MBS control logical channel and may include at least one of the period/repetition period, radio frame offset (e.g., SFN mod period) when the MBS control logical channel is scheduled, slot/slot offset/first slot number when the MBS control logical channel is scheduled in each radio frame, duration and scheduling information for non-continuous reception of the MBS control logical channel (on-duration timer, DRX inactivity timer, or start offset).

In the related art, the NR base station indicates an initial BWP through an SIB1 message to power-efficiently support, e.g., initial access/paging reception of the RRC idle/inactive UE. The SIB1 message includes an initial downlink BWP and initial uplink information in the downlink configuration common information element (downlinkConfigCommon IE) and uplink configuration common information element (uplinkConfigCommon IE), respectively, included in the serving cell configuration common information element (servingCellConfigCommon IE).

To support efficient MBS data reception of the RRC idle/inactive UE, the base station may transmit the MBS control logical channel only on the initial downlink BWP. Thus, the RRC idle/inactive UE interested in MBS reception may receive MBS configuration information on the initial downlink BWP, receiving MBS data. As another example, to support efficient MBS data reception of the RRC idle/inactive UE, the base station may include (dedicated) downlink BWP information for transmitting the MBS control logical channel in the MBS-related system information to indicate it. Thus, the initial downlink BWP may be flexibly operated. The RRC idle/inactive UE interested in MBS reception may receive MBS configuration information based on the downlink MBS control logical channel BWP information provided through the MBS system information on the initial downlink BWP and the schedule information for receiving the above-described MBS control logical channel, receiving MBS data.

As another example, to support efficient MBS data reception of the RRC idle/inactive UE, the base station may include (dedicated) downlink traffic logical channel BWP information for transmitting the MBS traffic logical channel in the MBS-related system information to indicate it. Or, to support efficient MBS data reception of the RRC idle/inactive UE, the base station may include (dedicated) downlink BWP information for transmitting the MBS traffic logical channel in the MBS control logical channel information to indicate it.

As another example, the downlink MBS BWP may be configured in association with the MBS session. Or, the downlink MBS BWP may be configured for each MBS session. Or, the downlink MBS BWP may be configured in association with any information (e.g., IP multicast address or MAC multicast address or any (group) identifier/address for identifying the group, TMGI, session ID, service ID, or application ID) for identifying the MBS session. The user equipment interested in the MBS session may receive the MBS on the MBS BWP. The MBS BWP may be configured to be associated/mapped one-to-one to the MBS session. Thus, the user equipment interested in the MBS session may receive data through the MBS BWP. Or, the MBS BWP may be configured to be associated/mapped to one or more MBS sessions. Thus, the network may flexibly operate the band. Or, one MBS session may be configured in association with one or more MBS BWPs. Thus, the network may support MBS switching.

As another example, one or more MBS-specific downlink traffic logical channel BWPs may be indicated and configured in the UE. The base station may instruct to switch the BWP through DCI. The RRC idle/inactive UE may receive MBS traffic logical channel data through the active BWP indicated through the DCI.

As another example, a default downlink traffic logical channel BWP for transmitting the MBS traffic logical channel may be configured. If the default MBS BWP (or default MBS BWP identifier) is configured, and the active downlink MBS BWP is not the BWP indicated by the default MBS BWP (or default MBS BWP identifier), when the PDCCH addressed with the RNTI for receiving the MBS traffic logical channel data is received on the active BWP, the UE may start/restart the BWP inactivity timer associated with the active downlink BWP. If the BWP inactivity timer associated with the active downlink BWP expires, the UE may perform BWP switching to the default downlink traffic logical channel BWP. An MBS session may be configured to be associated with, at least, the default downlink traffic logical channel BWP.

Embodiment of Receiving On-Demand MBS Configuration Information

The MBS configuration information for the RRC idle/inactive UE to receive MBS data may be indicated through MBS-related system information and/or MBS control logical channel. Meanwhile, in the MBS, a transmission mode (multicast point-to-multipoint transmission/broadcast pointto-multipoint transmission/unicast point-to-point transmission) may be determined/selected by the base station to transmit data. Unlike the typical LTE MBMS primarily targeting broadband broadcast, the 5G MBS may dynamically provide a service in each cell for a specific UE group, such as V2X, stadium, IP multicast transparent transmission, or IoT UE software upgrade. Upon broadcasting the MBS configuration information for receiving MBS data through MBS-related system information and/or MBS control logical channel, the wireless network may be overburdened due to frequent system information changes and control logical channel changes.

To address this issue, the base station may indicate the MBS-related system information and/or MBS control logical channel through an on-demand scheme. The on-demand scheme means that the UE requests the configuration information from the base station.

As an example, the base station may include system information request configuration information in system information scheduling information of SIB1 and transmit it.

If the system information scheduling information of SIB1 includes the system information request configuration information, the UE may initiate a random access procedure. In this case, as the PRACH preamble and PRACH resource, information included in the system information request configuration information may be used. The system information request configuration information may include broadcast state information to identify whether the system information is broadcast or is provided in the on-demand scheme rather than being broadcast. If the information indicates not being broadcast, the UE may initiate reception in the on-demand scheme. Upon receiving an acknowledgment for the system information request, the UE may obtain the requested system information message according to a procedure (e.g., TS 38.331 Section 5.2.2.3.2) according to the reception of the SI message.

Otherwise (if SIB1 does not include the system information request configuration information in the system information scheduling information), the UE may apply the default L1 parameter and default MAC cell group configuration specified in the physical layer standard to initiate transmission of the RRC system information request message. Upon receiving an acknowledgment for the RRC system information request message, the UE may obtain the requested system information message according to a procedure (e.g., TS 38.331 Section 5.2.2.3.2) according to the reception of the SI message.

The above-described RRC system information request message may include any information (e.g., IP multicast address or MAC multicast address or any (group) identifier/address for identifying the group, TMGI, session ID, service ID, or application ID) for identifying the MBS session. The base station may thereby indicate/provide MBS configuration information for the MBS session to the UE. The MBS configuration information may be indicated through any one of MBS-related system information, MBS control logical channel, CCCH RRC message for indicating the MBS configuration and RRC dedicated message (e.g., RRC reconfiguration message).

As another example, the UE may receive the MBS configuration information through the MBS-related system information in the on-demand scheme.

The base station may include MBS configuration information request information in the MBS-related system information and transmit it. If the MBS-related system information includes the MBS configuration information request information, the UE may initiate a random access procedure (using the information). For example, as the PRACH preamble and PRACH resource, the information included in the MBS configuration information request information may be used. The MBS configuration information request information may include broadcast state information to identify whether the MBS control logical channel information is broadcast or is provided in the on-demand scheme rather than being broadcast. If the information indicates not being broadcast, the UE may initiate reception in the on-demand scheme. Upon receiving an acknowledgment for the MBS configuration information request, the UE may obtain the requested MBS configuration information. As an example, the MBS configuration information may be received through the RRC dedicated message (e.g., RRC reconfiguration message) transmitted from the base station. As another example, the MBS configuration information may be received through the (broadcast) MBS control logical channel message.

Otherwise (if the MBS-related system information does not include the MBS configuration information request information), the UE may apply the default L1 parameter and default MAC cell group configuration specified in the physical layer standard to initiate transmission of the RRC information request information. The RRC information request message may be an RRC system information request message or a message distinguished therefrom. Upon receiving an acknowledgment for the RRC information request message, the UE may obtain the requested MBS configuration information. As an example, the MBS configuration information may be received through the RRC dedicated message (e.g., RRC reconfiguration message) transmitted from the base station. As another example, the MBS configuration information may be received through the (periodically broadcast) MBS control logical channel message. As another example, the MBS configuration information may be received through a CCCH RRC message (broadcast in response to the request) to indicate the MBS configuration.

The above-described RRC information request message may include any information (e.g., IP multicast address or MAC multicast address or any (group) identifier/address for identifying the group, TMGI, session ID, service ID, or application ID) for identifying the MBS session. The base station may thereby indicate/provide MBS configuration information for the MBS session to the UE.

As another example, the base station may include system information request configuration information in system information scheduling information of SIB1 and transmit it. If SIB1 includes the system information request configuration information in the system information scheduling information, the UE may initiate a random access procedure. In this case, as the PRACH preamble and PRACH resource, the information included in the system information request configuration information may be used. The system information request configuration information may include broadcast state information to identify whether the system information is broadcast or is provided in the on-demand scheme rather than being broadcast. If the information indicates not being broadcast, the UE may initiate reception in the on-demand scheme. Upon receiving an acknowledgment for the system information request, the UE may obtain the requested system information message according to a procedure (e.g., TS 38.331 Section 5.2.2.3.2) according to the reception of the SI message.

Otherwise (if SIB1 does not include the system information request configuration information in the system information scheduling information), the UE may apply the default L1 parameter and default MAC cell group configuration specified in the physical layer standard to initiate transmission of the RRC system information request message. Upon receiving an acknowledgment for the RRC system information request message, the UE may obtain the requested system information message according to a procedure (e.g., TS 38.331 Section 5.2.2.3.2) according to the reception of the SI message.

In the above-described operation, if the UE requests MBS-related system information, e.g., if indicating in association with a request for the MBS-related system information on the RRC system information request message or information included in the system information request configuration information, the base station may transmit the MBS configuration information. The base station may transmit the MBS-related system information and MBS configuration information/MBS control logical channel. The UE may obtain the requested MBS configuration information. As an example, the MBS configuration information may be received through the RRC dedicated message (e.g., RRC reconfiguration message) transmitted from the base station. As another example, the MBS configuration information may be received through the (periodically broadcast) MBS control logical channel message. As another example, the MBS configuration information may be received through a CCCH RRC message (broadcast in response to the request) to indicate the MBS configuration.

The above-described RRC system information request message may include any information (e.g., IP multicast address or MAC multicast address or any (group) identifier/address for identifying the group, TMGI, session ID, service ID, or application ID) for identifying the MBS session. The base station may thereby indicate/provide MBS configuration information for the MBS session to the UE.

Through the above-described embodiments, the UE in the RRC idle/inactive state may efficiently receive MBS data on the NR wireless network.

Hereinafter, embodiments for more efficiently controlling in receiving MBS data will be described. In particular, it may be preferable to deactivate a specific multicast session not to consume radio resources while multicast data is not transmitted to the UE for the specific multicast session. From this point of view, embodiments for supporting an activation/deactivation function for a multicast session will be described below.

Embodiment of Configuring MBS Radio Bearer According to MBS/Multicast Session State Upon Configuring MBS Session First, various MBS sessions (e.g., MBS session states) are defined as follows for resource-efficient multicast data transmission.

Configured multicast session (e.g., multicast session configuration state): multicast data is not transmitted. Some information regarding the multicast session is configured. However, no resource is reserved. For example, a TMGI is allocated, but complete session information is not provided to the UE. The UE may be allowed to join. However, a first accepted UE join request will trigger a multicast session establishment.

Active multicast session (e.g., multicast session active state): Multicast data is transmitted to the UE that has joined the multicast session. A 5GC resource for the multicast session is reserved. A corresponding radio resource is reserved according to the position of the joining UE. The UE joining the multicast session is in the CM CONNECTED state. The UE is allowed to join the multicast session. It is a multicast session configured in the active state.

Inactive multicast session (e.g., multicast session inactive state): multicast data is not transmitted. The UE joining the multicast session is in the CM CONNECTED or CM IDLE state. The UE is allowed to join the multicast session. It is a multicast session configured in the inactive state.

A multicast session configuration procedure may be provided. There is a network internal configuration for the multicast session, as, e.g., TMGI allocation request and/or providing information regarding the multicast session by the application function. No resource for the multicast session is reserved, or a resource may be reserved only in the MBS-related core network entity (e.g., MB-SMF, MB-UPF, or NEF). In contrast, in the state, multicast data is not transmitted. The configuration may indicate whether or when a multicast session is created, and whether the multicast session is in an inactive state. The application function may provide a configuration in several steps. For example, it may be allowed to request a TMGI and then provide and configure the entire information regarding the multicast session.

A multicast session configuration procedure may be provided. When the join request of the first UE for the multicast session is accepted, the multicast session is set to the inactive or active state depending on the configuration. A 5GC resource for the multicast session is being reserved.

A multicast session activation procedure may be provided. The CM IDLE UE joining the multicast session is paged. Activation may be triggered by the application function request. Or, activation may be triggered by reception of multicast data.

A multicast session deactivation procedure may be provided. Deactivation may be triggered by the application function request. Or, deactivation may be triggered by lack of reception of multicast data.

A multicast session release procedure may be provided. All resources for the multicast session are released for all of the 5GC nodes and wireless network nodes. The UE joining the multicast session is notified of it. Release is possible for an active or inactive multicast session.

A multicast session deconfiguration procedure may be provided. All information regarding the multicast session is removed from the 5GC. TMGI is deallocated.

When a multicast session is configured, the multicast session may be set to the active state or inactive state. On the multicast session configuration procedure (for the active multicast session), the base station may set up/configure a data radio bearer mapped to the PDU session associated with the multicast session and/or the MBS radio bearer mapped to the multicast session and set the multicast session (to the active state). Or, on the multicast session configuration procedure (for the inactive multicast session), the base station may set up/configure only the data radio bearer mapped to the PDU session associated with the multicast session and set the multicast session (to the inactive state). Or, on the multicast session configuration procedure (for the inactive multicast session), the base station may set the multicast session (to the inactive state) without setting up/configuring a data radio bearer mapped to the PDU session associated with the multicast session or the MBS radio bearer mapped to the multicast session. This will be described below in greater detail.

To join a multicast group, the UE transmits a PDU session modify request message to the AMF. The message includes an MBS session ID for indicating the multicast group that the UE desires to join.

The AMF receives an MBS context for the multicast session from a relevant 5GC node/entity (SMF/MB-SMF) through signaling. The MBS session context may include one or more of MBS session ID, source specific multicast address, TMGI, multicast QoS flow information, MBS session AMBR, associated PDU session context, PDU session ID, S-NSSAI, PDU session AMBR, associated unicast QoS flow-multicast QoS flow information mapping/association, and multicast session state (active/inactive), and information as to whether to support the multicast session state (active/inactive).

The AMF transmits an N2 message including PDU session modify command information to the base station. The PDU session modify command information or N2 message may include MBS context information. The PDU session modify command information or N2 message may include the MBS session state (or multicast session state or information for indicating activation/deactivation of the MBS/multicast session). For example, the MBS session state (or multicast session state or information for indicating activation/deactivation of the MBS/multicast session) may be configured of one-bit information to distinguish active/inactive states (activation/deactivation indications).

If the base station supporting the MBS receives the MBS session ID, but no multicast session context is present for the MBS session ID, the base station uses the MBS session QoS information for allocating a resource for serving the MBS session. If the base station does not support the MBS, 5GC individual MBS traffic delivery may be performed. For example, the base station may transmit the MBS data received through an individual tunnel between the base station and the UPF/MB-UPF to the UE using the PDU session context associated with the MBS session, in a PTP scheme using a normal data radio bearer.

As an example, when the MBS session state is set to the active state and indicated (through the N2 message), the base station may transmit an RRC reconfiguration message including radio resource configuration information for receiving the MBS session data to the UE. The RRC reconfiguration message may include MBS radio bearer configuration information mapped to the MBS session and/or the data radio bearer mapped to the PDU session associated with the MBS session. The data radio bearer may be configured based on the PDU session context (e.g., QoS flow information) mapped/associated to the MBS session. The data radio bearer may be transmitted in the PTP scheme using the 5GC individual MBS traffic delivery. The RRC reconfiguration message may include MBS session state information (active/inactive). The RRC reconfiguration message may be configured in association with the multicast session state for the MBS radio bearer mapped to the multicast session. As an example, the MBS radio bearer mapped to the multicast session (or data radio bearer mapped to the PDU session associated with the MBS session) may be configured separately in the active/inactive states. As another example, the MBS radio bearer mapped to the multicast session (or data radio bearer mapped to the PDU session associated with the MBS session) may be configured separately in the active/inactive states.

(When the multicast session state is set to the active state and indicated), the UE may configure the MBS radio bearer and/or data radio bearer mapped to the PDU session associated with the MBS session. The UE may receive MBS session data through the configured MBS radio bearer and/or data radio bearer mapped to the PDU session associated with the MBS session.

Figure 13:
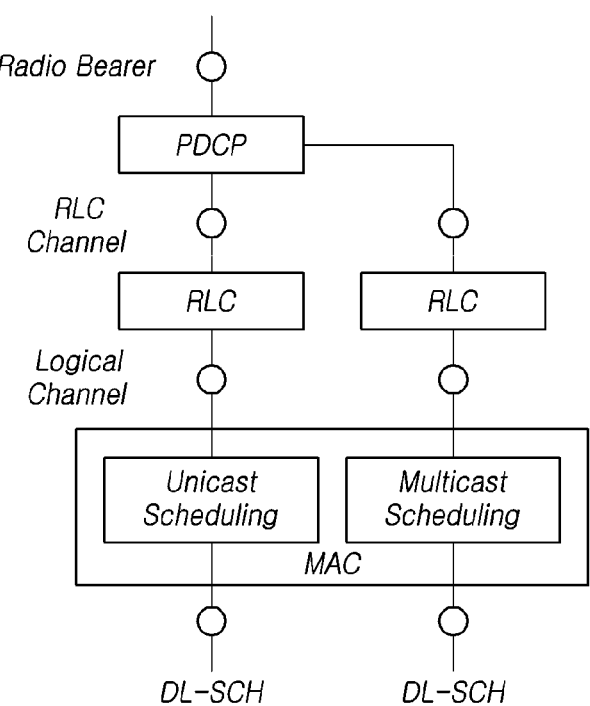
FIG. 13 is a view illustrating a radar 2 structure for receiving MBS data according to an embodiment.

FIG. 13 is a view illustrating a radar 2 structure for receiving MBS data according to an embodiment.

Referring to FIG. 13, for an MBS service session belonging to one multicast group, a MBS radio bearer may be defined as a separate bearer structure having two legs/paths. One leg/path of the MBS radio bearer based on the separate bearer structure may include L2 entity(ies) configuration for (normal) unicast DRB for PTP transmission and perform PTP transmission. The other leg/path may include L2 entity (ies) configuration for PTM transmission and perform PTM transmission.

The RLC entity of unicast leg/path for PTP transmission may be configured in association with the logical channel identifier. Data may be received by scheduling indicated by the C-RNTI in the MAC. The RLC entity of the leg/path for PTM transmission may be configured in association with the RNTI capable of receiving data separate for each MBS session or for identifying the MBS session data transmission. Here, for convenience of description, MBS user data is denoted as NR-MTCH, but this is only for convenience of description and may be replaced with any other terms (e.g., MB Traffic Channel, Multicast Traffic Channel). Further, the RNTI for MBS data identification means a multicast session/multicast group specific RNTI or a group common RNTI for multicast traffic/data, similar to SC-RNTI and G-RNTI. Here, for convenience of description, it is denoted as MBS-G-RNTI. This is simply for ease of description, and it may be replaced with another term.

The RLC entity of the unicast leg/path for PTP transmission and the RLC entity of the leg/path for PTM transmission may be associated with one PDCP entity. The PDCP entity may be associated with an MBS service session (TMGI/MBS session ID/IP multicast address). The UE may receive MBS service data transmitted according to the transmission scheme selected by the base station. For example, the base station may transmit data through one path (or two paths) of the RLC entity of the unicast leg/path for PTP transmission and the RLC entity of the leg/path for PTM transmission in the PDCP entity and the UE may receive the data. The base station is aware of one set of UEs having joined the corresponding multicast group. For example, in the structure as shown in FIG. 13, there may be as many RLC entities of the leg/path for PTM transmission as the number of RRC connected UEs having joined the corresponding multicast group.

As another example, when the MBS session state is set to the inactive state and indicated through the N2 message. The base station may indicate an RRC reconfiguration/release message including radio resource configuration information for receiving the MBS session data to the UE. The RRC reconfiguration/release message may include MBS radio bearer configuration information mapped to the MBS session. The RRC reconfiguration/release message may include multicast session state information (inactive). The RRC reconfiguration/release message may include inactive MBS radio bearer configuration information associated with the MBS session. The RRC reconfiguration/release message may include MBS radio bearer configuration information to be suspended, associated with the MBS session. The RRC reconfiguration/release message may include any configuration information for indicating that the MBS session is in the inactive state.

As another example, when the multicast session state is set to the inactive state and indicated through the N2 message (or when indicating the deactivation of the multicast session), the base station may transmit an RRC reconfiguration message including radio resource configuration information for the UE to receive the MBS session data to the UE. Or, the base station may transmit an RRC release message to release/suspend the radio resource configuration information for the UE to receive the MBS session data to the UE. The RRC reconfiguration/release message may include a PDU session modify command message. The PDU session modify command may be included and transmitted in the dedicatedNAS-Message information element. The PDU session modify command message may include multicast session state information (inactive). The RRC reconfiguration/release message may include MBS radio bearer configuration information mapped to the MBS session. The NAS/higher layer of the UE receiving the PDU session modify command may indicate the state information (inactive) about the multicast session to the AS/RRC/lower layer. The RRC of the UE may suspend/release/switch to the inactive state the MBS radio bearer mapped to the multicast session.

As another example, when the multicast session state is set to the inactive state and indicated through the N2 message (or when indicating the deactivation of the multicast session), the base station may transmit an RRC reconfiguration/release message including radio resource configuration information for the UE to receive the MBS session data to the UE. The RRC reconfiguration/release message may include a PDU session modify command message. The PDU session modify command may be included and transmitted in the dedicatedNAS-Message information element. The PDU session modify command message may include multicast session state information (inactive). If the MBS radio bearer mapped to the MBS session is configured in the UE, the RRC reconfiguration/release message may include information for instructing to suspend the MBS radio bearer configuration information mapped to the MBS session. The RRC reconfiguration/release message may include data radio bearer configuration information mapped to the PDU session associated with the MBS session.

The operations provided in all the above-described examples may be an example of reception of any information to indicate that the state of the multicast session is inactive.

Upon receiving any information to indicate that the state of the multicast session is inactive, the UE may perform one or more operations as follows.

The UE may configure the MBS radio bearer. The UE may store the MBS radio bearer. The UE may configure/store the MBS radio bearer in the inactive state. The UE may suspend the MBS radio bearer. The UE may suspend reception of data for the MBS session. The UE may consider that the MBS radio bearer is in the inactive multicast session state. The UE does not perform data reception through the MBS-G-RNTI. The UE stops/pauses/suspends data reception through the MBS-G-RNTI. The UE does not perform PDCCH monitoring through the MBS-G-RNTI. The UE does not perform group common PDCCH monitoring through the MBS-G-RNTI. The UE may release the MBS radio bearer. The UE may configure the data radio bearer mapped to the PDU session associated with the MBS session. The UE may suspend the data radio bearer mapped to the PDU session associated with the MBS session. Or, the UE may receive data through the data radio bearer mapped to the PDU session associated with the MBS session.

Embodiment for a Procedure According to Change of an MBS Session State and Related Operations When the MBS session supports the multicast session state (active/inactive change), the state change/switching (active/inactive) for the MBS session may be triggered by an application function request or by whether to receive multicast data. An activation/deactivation procedure may be initiated by the trigger.

According to an embodiment, when the MBS session supports the inactive state (or active-inactive state switch) on the MBS session configuration procedure, the AMF/SMF/MB-SMF may transmit one or more of the MBS session state (active/inactive), indication information for enabling MBS session state change (function), and timer (value) for checking the MBS session state change to the UPF/MB-UPF/base station. The UPF/MB-UPF/base station receiving the information may check the MBS session state change if the MBS session state is set to active. For example, if transmitting/receiving data/logical channel associated with the MBS session, the UPF/MB-UPF/base station starts or restarts the timer for checking the MBS session state change. If the timer for checking the MBS session state change expires, the UPF/MB-UPF/base station may transmit information for indicating MBS session deactivation to the AMF/SMF/MB-SMF. According to another embodiment, if the AMF/SMF/MB-SMF receives information for indicating MBS session deactivation, the AMF/SMF/MB-SMF may request the base station to deactivate the MBS session. According to another embodiment, if receiving data/logical channel associated with the MBS session from the UPF/MB-UPF, the base station starts or restarts the timer for checking the MBS session state change. If the timer for checking the MBS session state change expires, the base station may transmit information for indicating MBS session deactivation to the AMF.

According to another embodiment, upon receiving data for the multicast session in the inactive state, the MB-UPF/UPF/base station may notify the AMF/SMF/MB-SMF of it. The notification message may include MBS session identification information. The notification message may include indication information/message for notifying of downlink data for the MBS session (or for indicating that activation of the MBS session has been triggered). Upon receiving the message, the AMF may request/instruct the base station to activate the MBS session. The message for the AMF to request/instruct the base station to activate the MBS session may include one or more of paging message/related information, MBS session ID, information for indicating the MBS session state and information for indicating MBS session activation/deactivation. When there is a UE in the RRC idle state, joining the multicast session, the AMF may page the UE through a CN-initiated paging procedure. The paging message transmitted from the AMF to the base station may include one or more of MBS session ID information, information for indicating the MBS session state, and information for indicating activation/deactivation of the MBS session. The paging message transmitted to the UE by the base station may include one or more of MBS session ID information, information for indicating the MBS session state, and information for indicating activation/deactivation of the MBS session. The paging message may include the paging record or UE identifier information element included in the paging record. As the UE identifier information element included in the paging record, a 48-bit NG-5G-S-TMSI or a 40-bit full-RNTI may be selected. If the MBS session ID is a value smaller than 48 bits, it may be included and transmitted on the UE identifier information element. When the MBS session ID included in the paging message matches the MBS session ID of the inactive multicast session joined by the UE, the UE may initiate/perform any operation for receiving data through the MBS radio bearer or any procedure (RRC resume or RRC establishment) to resume the MBS radio bearer. For example, the UE may instruct the base station to resume/activate data reception for the MBS session through the MAC CE and to resume/activate data reception through the MBS radio bearer. As another example, any operations included in the disclosure may be an example of any operation to receive data through the MBS radio bearer.

According to another embodiment, when there is a UE in the RRC inactive state, joining the inactive multicast session, the base station may page the UE through a RAN-initiated paging procedure. The paging message transmitted to the UE by the base station may include one or more of MBS session ID information, information for indicating the MBS session state, and information for indicating activation/deactivation of the MBS session. The paging message may include the paging record or UE identifier information element included in the paging record. Or, the paging message may be provided by the base station to the UE having switched to the RRC inactive state (RRC release with suspendconfig) among the UEs joining the multicast session. The paging message may include the paging record or UE identifier information element included in the paging record. As the UE identifier information element included in the current paging record, a 48-bit NG-5G-S-TMSI or a 40-bit full-RNTI may be selected. If the MBS session ID is a value smaller than 48 bits, it may be included and transmitted on the UE identifier information element. When the MBS session ID included in the paging message matches the MBS session ID of the inactive multicast session joined by the UE, the UE may initiate/perform any operation for receiving data through the MBS radio bearer or any procedure (RRC resume or RRC establishment) to resume the MBS radio bearer. For example, the UE may instruct the base station to resume/activate data reception for the MBS session through the MAC CE and to resume/activate data reception through the MBS radio bearer. As another example, any operations included in the disclosure may be an example of any operation to receive data through the MBS radio bearer.

If the base station receives information to instruct to deactivate the multicast session from the AMF (or any 5GC node/entity), the base station may store the inactive state of the multicast session on the UE context of the UE. The base station may transmit an RRC release message (RRC release or RRC release with suspendconfig) according to the data inactivity timer of the UE, allowing the UE to enter the RRC idle or RRC inactive state. When the UE switches to the RRC inactive state, the AMF does not page the UE because it considers the UE as being in the CM CONNECTED state. Accordingly, if the multicast session state is triggered to change/switch from the inactive state to the active state, e.g., if the base station receives information for instructing to activate the multicast session from the AMF (or any 5GC node/entity), and/or if the base station receives data for the multicast session, the base station should perform RAN-initiated paging on the UE.

According to another embodiment, upon receiving the active multicast session state from the AMF or upon receiving information for instructing to activate the multicast session from the AMF, the base station may also receive assistance information to instruct the UE not to switch to the RRC inactive state. The message including the assistance information may include one or more of MBS session ID information, information for indicating the MBS session state, information for indicating activation/deactivation of the MBS session, and information as to whether to support the MBS session state. The assistance information may be included in the core network assistance information for RRC inactive information element. The assistance information may be provided in an information element distinguished from the core network assistance information for RRC inactive. If the assistance information is received, the base station may store the information. The base station may use the stored assistance information for determining the RRC inactive state or RAN paging. Or, the base station may release/remove/discard/update/disregard/override the stored core network assistance information for RRC inactive.

Hereinafter, additional embodiments will be described.

A UE may be configured with a data inactivity monitoring function by RRC in a RRC connected state. If a data inactivity timer is configured, the UE should operate as follows.

1) If any MAC entity receives a MAC SDU for dedicated traffic channel (DTCH) logical channel, dedicated control channel (DCCH) logical channel, or common control channel (CCCH) logical channel, or 1) If any MAC entity transmits a MAC SDU for DTCH logical channel or DCCH logical channel, 2) the UE (MAC entity of the UE) starts or restarts the data inactivity timer.

1) If the data inactivity timer expires, 2) the UE (MAC entity of the UE) indicates expiration of the data inactivity timer to the higher layer (RRC).

If the higher layer (e.g., RRC) of the UE receives expiration of the data inactivity timer from the lower layer (e.g., MAC), the UE performs an action to enter the RRC IDLE. The UE resets the MAC and releases all the radio resources and indicates the release of the RRC connection to the NAS/application layer.

If the UE receives data associated with the active multicast session through an MBS session activation procedure, it is needed to maintain the RRC connected state of the UE in the active multicast session state. Or, the UE needs to control the receiving UE not to switch to the RRC idle state before MBS session deactivation is triggered. Or, when an MBS radio bearer associated with the active MBS session is configured and the UE is receiving data, the receiving UE needs to be controlled not to switch to the RRC idle state.

Otherwise, the UE may switch to the RRC idle state and have difficulty in receiving MBS session data. Specifically, even in the RRC idle state, it may be controlled to maintain the MBS radio bearer configuration to receive data. However, in this case, the base station does not maintain the UE's context, so that it may be hard to continuously provide service as the UE moves.

The base station may configure the MBS radio bearer mapped to the active MBS session to the UE through a multicast session configuration procedure. Or, the base station may set the MBS session to the active state through the multicast session configuration procedure, configure the MBS radio bearer mapped to the MBS session to the UE, and transmit MBS data. Or, the base station may set/activate the MBS session to the active state through the multicast session activation procedure, configure/modify/change the MBS radio bearer mapped to the MBS session to the UE and transmit MBS data.

The base station may receive an N2 message (or message from 5GC through the AMF) from the AMF (or any 5GC node/entity, e.g., SMF/MB-SMF) through a multicast session configuration procedure or multicast session activation procedure. The N2 message may include information for indicating the multicast session as the active state or information for indicating activation of the multicast session. The N2 message may include a paging message for paging the CM IDLE UE joining the multicast session. The information for indicating the multicast session as active state or information for indicating activation of the multicast session may be included in the paging message for paging the CM IDLE UE joining the multicast session. The N2 message may include MBS session context information. The MBS session context information may include one or more of MBS session ID, source specific multicast address, TMGI, multicast QoS flow information, MBS session AMBR, associated PDU session context, PDU session ID, S-NSSAI, PDU session AMBR, associated unicast QoS flow-multicast QoS flow information mapping/association, and multicast session state (active/inactive), and information as to whether to support the multicast session state (active/inactive).

Upon receiving the information, the base station may transmit a paging message to page the CM IDLE UE joining the multicast session through the radio interface (Uu). Upon receiving the information, the base station may transmit a paging message to page the RRC INACTIVE UE joining the multicast session through the radio interface (Uu). Upon receiving the information, the base station may set/activate the MBS session to the active state and transmit, to the UE, the RRC reconfiguration message for configuring/modifying/changing the MBS radio bearer mapped to the MBS session to the UE. In this case, the base station may be allowed not to configure the data inactivity function/timer. Upon receiving the information, the base station may set/activate the MBS session to the active state and transmit, to the UE, the RRC reconfiguration message for configuring/modifying/changing the MBS radio bearer mapped to the MBS session to the UE. In this case, if the data inactivity function/timer is configured/applied to the UE, the base station may release the configuration. For example, if the operation has been configured/reconfigured/applied as the UE's MAC-cell group configuration includes the data inactivity timer in the previous configuration, the base station includes information for releasing the data inactivity timer in the MAC-cell group configuration on the RRC reconfiguration message. Or, the base station may include information for instructing to release the data inactivity timer in the MAC-cell group configuration on the RRC reconfiguration message, allowing the UE to reconfigure/modify/release the function/timer. Or, the base station may allow the UE to reconfigure/modify/release the function/timer by not including the data inactivity timer in the MAC-cell group configuration on the RRC reconfiguration message. The base station may indicate a specific value (e.g., infinity) as the data inactivity timer value in the MAC-cell group configuration on the RRC reconfiguration message, allowing the UE to reconfigure/modify/release the function/timer so that the function is not operated. For example, the base station may indicate the timer value as the infinite value, disabling the timer/function.

In the typical art, the data inactivity timer value may be one of {s1, s2, s3, s5, s7, s10, s15, s20, s40, s50, s60, s80, s100, s120, s150, and s180, where s1 means 1 second}. One value for disabling the function may be designated and applied to the UE, or a new value may be added to disable the function.

According to another embodiment, the base station may add data reception through the MBS radio bearer mapped to the MBS session to the data inactivity timer operation in the MAC and process it, thereby preventing the UE from switching to the RRC idle state while receiving MBS session data.

According to an embodiment, if the logical channel associated with the MBS session is received when the data inactivity timer is configured, the UE may start or restart the data inactivity timer. The logical channel associated with the MBS session may indicate the MBS traffic logical channel and/or MBS control logical channel.

According to another embodiment, if receiving multicast data for the active multicast session when the data inactivity timer is configured for the UE in the RRC connected state, the UE may start or restart the data inactivity timer. The multicast data may indicate the multicast traffic channel and/or multicast control channel logical channel.

1) If any MAC entity receives a MAC SDU for dedicated traffic channel (DTCH) logical channel, dedicated control channel (DCCH) logical channel, common control channel (CCCH) logical channel, or MB traffic channel logical channel, or MB control channel logical channel, 1) If any MAC entity transmits a MAC SDU for DTCH logical channel or DCCH logical channel, 2) the UE (MAC entity of the UE) starts or restarts the data inactivity timer.

1) If the data inactivity timer expires, 2) the UE (MAC entity of the UE) indicates expiration of the data inactivity timer to the higher layer (RRC).

The base station may receive information for indicating the multicast session as the active state or information for indicating activation of the multicast session. Upon receiving the information (or including any information included in the above-described embodiments, such as MBS context information), the base station may set/activate the MBS session as active state and transmit an RRC reconfiguration message for configuring/modifying/changing the MBS radio bearer mapped to the MBS session to the UE. Upon receiving the message (or upon receiving any related indication information, such as MBS session activation state indication, data inactivity timer pause/stop/suspend indication), the UE may stop/pause/suspend the MBS data inactivity timer. Thus, the UE may be prevented from switching to RRC idle state due to the function.

The base station may receive information for indicating the multicast session as the active state or information for indicating activation of the multicast session. Upon receiving the information (or including any information included in the above-described embodiments, such as MBS context information), the base station may set/activate the MBS session as active state and transmit an RRC reconfiguration message for configuring/modifying/changing the MBS radio bearer mapped to the MBS session to the UE. Upon receiving the message (or upon receiving any related indication information, such as MBS session activation state indication, data inactivity timer pause/stop/suspend indication), the UE may stop/pause/suspend the MBS data inactivity timer. Thus, the UE may be prevented from switching to the RRC idle state due to the function.

Through the above-described operations, the UE may effectively receive MBS service data.

For convenience of description, although the above-described embodiments have been described in connection with the RRC idle/inactive UE, it is obvious that the above-described method is applicable to the RRC connected UE and belongs to the category of the present embodiments. In this case, the term of the RRC request message may be replaced with any term distinguished from the RRC idle/inactive message.

Hereinafter, configurations of a UE and a base station which may perform the above-described embodiments individually or in combination will be described.

Figure 14:
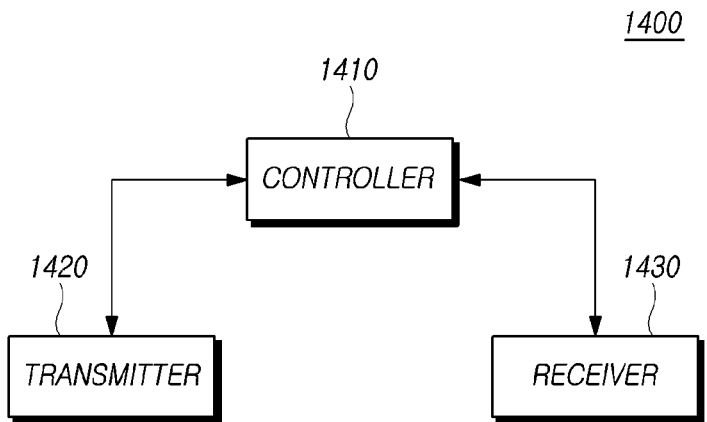
FIG. 14 is a block diagram illustrating a UE according to an embodiment.

FIG. 14 is a block diagram illustrating a UE according to an embodiment.

Referring to FIG. 14, a UE 1400 processing multicast and broadcast services (MBS) data includes a controller 1410 configured to control switching from an RRC state to an RRC inactive state and a receiver 1430 configured to receive a message for MBS session state notification from a base station. The controller 1410 may initiate a RRC connection resume procedure for switching the RRC state based on the message.

According to an embodiment, the controller 1410 may switch the RRC state to the RRC inactive state by the instruction of the base station or by trigger of the higher layer of the UE. The controller 1410 may switch from the RRC connected state or the RRC idle state to the RRC inactive state.

According to another embodiment, when switching to the RRC inactive state, the controller 1410 may suspend the MBS radio bearer for the MBS session. In other words, the controller 1410 may suspend the MBS radio bearer, configured in the UE, to receive MBS data while switching to the RRC inactive state.

According to another embodiment, the receiver 1430 may receive an RRC connection release message including information for instructing whether to activate the MBS session from the base station before switching to the RRC inactive state. The information for instructing whether to activate the MBS session means information for instructing to activate or deactivate the MBS session configured in the UE 1400. The information may be received by the UE through the RRC connection release message. Upon receiving the RRC connection release message, the controller 1410 may switch its state from the RRC connected state to the RRC inactive state or RRC idle state. Further, the controller 1410 may activate or deactivate the MBS session configured in the UE, based on the information for instructing whether to activate the MBS session.

Meanwhile, the MBS session state notification may be one of an initiate notification for at least one MBS session, a change notification for at least one MBS session, and an activate notification for at least one MBS session. The MBS session initiate notification may mean notification to initiate MBS data transmission for the corresponding MBS session or notification to initiate transmission of configuration information for the corresponding MBS session. The MBS session change notification may mean notification to change, e.g., configuration information for the corresponding MBS session. Or, the MBS session activate notification may mean notification of activation or deactivation of the corresponding MBS The message for the MBS session state notification may include one or more pieces of MBS session identification information. Further, the message for MBS session notification may be a paging message. The MBS session identification information may be included in the form of a list. For example, the MBS session identification information may include at least one of temporary mobile group identity (TMGI), MBS session ID, and IP multicast address information.

The controller 1410 may identify the initiate/change/activate notification of the MBS session of interest through the above-described message.

Upon receiving the MBS session notification through the above-described message, the controller 1410 may initiate the RRC connection resume procedure to switch the state from the RRC inactive state to the RRC connected state. The RRC connection resume procedure may be triggered by the UE's higher layer.

According to an embodiment, upon receiving the paging message for MBS session notification, the controller 1410 identifies the MBS session identification information included in the paging message. When joining the MBS session included in the paging message, the controller 1410 may trigger initiation of the RRC connection resume procedure to switch to the RRC connected state.

Thus, even in the RRC idle or RRC inactive state, the UE 1400 may receive the initiate/change/activate notification for the MBS session that it joins through the paging message. Further, the UE 1400 may switch the RRC state only when necessary based on the notification for the MBS session, preventing unnecessary power consumption.

Besides, the controller 1410 controls the overall operation of the UE 1400 necessary for MBS configuration and MBS data reception necessary for performing the above-described embodiments.

The transmitter 1420 and the receiver 1430 are used to transmit or receive signals or messages or data necessary for performing the above-described embodiments, with the base station.

Figure 15:
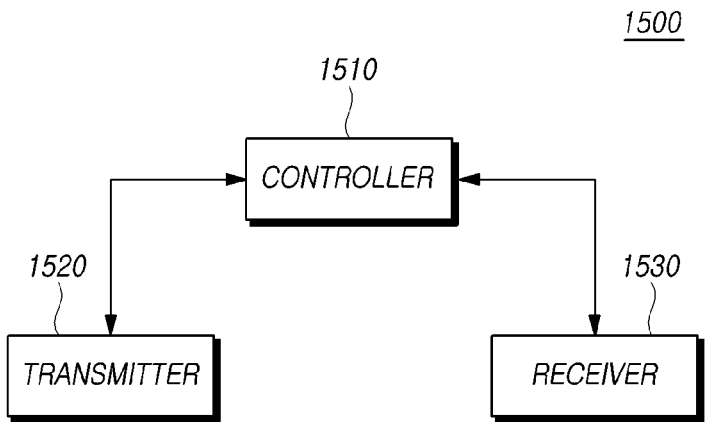
FIG. 15 is a block diagram illustrating a base station according to an embodiment.

FIG. 15 is a block diagram illustrating a base station according to an embodiment.

Referring to FIG. 15, a base station 1500 for controlling multicast and broadcast services (MBS) data processing of a UE may include a transmitter 1520 configured to transmit, to a UE, an RRC connection release message including information for indicating whether to activate an MBS session and transmitting, to the UE, a message for MBS session state notification in a state in which the UE switches to an RRC inactive state, and a receiver 1530 configured to receive an RRC connection request message from the UE when the UE initiates an RRC connection resume procedure based on the message.

For example, the information for instructing whether to activate the MBS session means information for instructing to activate or deactivate the MBS session configured in the UE. The information may be transmitted to the UE through the RRC connection release message. Upon receiving the RRC connection release message, the UE may switch its state from the RRC connected state to the RRC inactive state or RRC idle state. Further, the UE may activate or deactivate the MBS session configured in the UE, based on the information for instructing whether to activate the MBS session.

According to an embodiment, the UE may switch the RRC state to the RRC inactive state by the instruction of the base station or trigger of the higher layer of the UE. The UE may switch from the RRC connected state or RRC idle state to the RRC inactive state.

According to another embodiment, when the UE switches to the RRC inactive state, the MBS radio bearer for the MBS session may be suspended. In other words, the UE may suspend the MBS radio bearer, configured in the UE, to receive MBS data while switching to the RRC inactive state.

The MBS session state notification may be any one of an initiate notification for at least one MBS session, a change notification for at least one MBS session, and an activate notification for at least one MBS session.

The message for the MBS session state notification may include one or more pieces of MBS session identification information. Further, the message for MBS session notification may be a paging message. The MBS session identification information may be included in the form of a list.

For example, the MBS session identification information may include at least one of temporary mobile group identity (TMGI), MBS session ID, and IP multicast address information.

The base station may perform the initiate/change/activate notification of the MBS session of interest to the UE through the above-described message.

Upon receiving the MBS session notification through the above-described message, the UE may initiate the RRC connection resume procedure to switch the state from the RRC inactive state to the RRC connected state. The RRC connection resume procedure may be triggered by the UE's higher layer. If the RRC connection resume procedure is initiated, the receiver 1530 may receive the RRC connection request message from the UE. The RRC connection request message may include information for requesting to switch the connection state from the RRC inactive state to the RRC connected state.

According to an embodiment, upon receiving the paging message for MBS session notification, the UE identifies the MBS session identification information included in the paging message. When joining the MBS session included in the paging message, the UE may trigger initiation of the RRC connection resume procedure to switch to the RRC connected state.

Thus, even in the RRC idle or RRC inactive state, the UE may receive the initiate/change/activate notification for the MBS session that it joins through the paging message. Further, the UE may switch the RRC state only when necessary based on the notification for the MBS session, preventing unnecessary power consumption.

Besides, the controller 1510 transmits MBS data to the UE, necessary to perform the above-described embodiments and controls the overall operation of the base station 1500 necessary to configure the MBS.

The transmitter 1520 and the receiver 1530 are used to transmit or receive signals or messages or data necessary for performing the above-described embodiments, with the base station.

The above-described embodiments may be supported by the standard documents disclosed in IEEE 802, 3GPP, and 3GPP2 which are radio access systems. In other words, steps, components, and parts not described to clarify the technical spirit in the embodiments may be supported by the above-described standard documents. Further, all the terms disclosed in the disclosure may be described by the standard documents disclosed above.

The present embodiments described above may be implemented through various means. For example, the present embodiments may be implemented by various means, e.g., hardware, firmware, software, or a combination thereof.

When implemented in hardware, the method according to the present embodiments may be implemented by, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, the method according to the present embodiments may be implemented in the form of a device, procedure, or function performing the above-described functions or operations. The software code may be stored in a memory unit and driven by a processor. The memory unit may be positioned inside or outside the processor to exchange data with the processor by various known means.

The above-described terms, such as "system," "processor," "controller," "component," "module," "interface," "model," or "unit," described above may generally refer to computer-related entity hardware, a combination of hardware and software, software, or software being executed. For example, the above-described components may be, but are not limited to, processes driven by a processor, processors, controllers, control processors, entities, execution threads, programs, and/or computers. For example, both an application being executed by a controller or a processor and the controller or the processor may be the components. One or more components may reside within a process and/or thread of execution, and the components may be positioned in one device (e.g., a system, a computing device, etc.) or distributed in two or more devices.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention and should be appreciated that the scope of the present invention is not limited by the embodiments. The scope of the present invention should be construed by the following claims, and all technical spirits within equivalents thereof should be interpreted to belong to the scope of the present invention.

The invention claimed is:

1. A method for processing multicast and broadcast services (MBS) data by a user equipment (UE), the method comprising:
    switching a radio resource control (RRC) state to an RRC inactive state;
    receiving a paging message transmitted from a base station according to MBS session activation or MBS data reception of the base station; and
    initiating an RRC connection resume procedure for an RRC state change based on the paging message,
    wherein initiating the RRC connection resume procedure is triggering the RRC connection resume procedure based on identifying that the MBS session included in the paging message is a session that the UE has joined.

2. The method of claim 1,
    wherein the paging message includes one or more pieces of MBS session identification information, and
    wherein the MBS session identification information includes at least one of temporary mobile group identity (TMGI), MBS session identifier (ID), and internet protocol (IP) multicast address information.

3. The method of claim 1, wherein the switching further includes suspending an MBS radio bearer for the MBS session.

4. A method for controlling, by a base station, multicast and broadcast services (MBS) data processing of a user equipment (UE), the method comprising:
    transmitting, to the UE, a radio resource control (RRC) connection release message including information for indicating whether to activate an MBS session;
    transmitting a paging message to the UE according to MBS session activation or MBS data reception in a state in which the UE switches to an RRC inactive state; and
    receiving an RRC connection request message from the UE when the UE initiates an RRC connection resume procedure based on the paging message, wherein the UE initiates the RRC connection resume procedure based on identifying that the MBS session included in the paging message is a session that the UE has joined.

5. The method of claim 4, wherein the paging message includes one or more pieces of MBS session identification information, and wherein the MBS session identification information includes at least one of temporary mobile group identity (TMGI), MBS session identifier (ID), and internal protocol (IP) multicast address information.

6. The method of claim 4, wherein the UE suspends an MBS radio bearer for the MBS session to switch to the RRC inactive state.

7. A user equipment (UE) for processing multicast and broadcast services (MBS) data, comprising:

a controller configured to control switching a radio resource control (RRC) state to an RRC inactive state; and a receiver configured to receive a paging message transmitted from a base station according to MBS session activation or MBBS data reception of the base station, wherein the controller initiates an RRC connection resume procedure for an RRC state change based on the paging message, wherein the controller controls to trigger initiation of the RRC connection resume procedure based on identifying that the MBS session included in the paging message is a session that the UE has joined.

8. The UE of claim 7, wherein the paging message includes one or more pieces of MBS session identification information, and wherein the MBS session identification information includes at least one of temporary mobile group identity (TMGI), MBS session identifier (ID), and internet protocol (IP) multicast address information.

9. The UE of claim 7, wherein the controller controls to suspend an MBS radio bearer for the MBS session and switch to the RRC inactive state.

* * * * *